(12) United States Patent
Kusaka

(10) Patent No.: US 7,783,185 B2
(45) Date of Patent: Aug. 24, 2010

(54) IMAGE SENSOR, IMAGING DEVICE AND IMAGING METHOD

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 783 days.

(21) Appl. No.: 11/704,194

(22) Filed: Feb. 9, 2007

(65) Prior Publication Data
US 2007/0237511 A1  Oct. 11, 2007

(30) Foreign Application Priority Data
Apr. 5, 2006  (JP) ............................... 2006-104402

(51) Int. Cl.
*G03B 13/36* (2006.01)
(52) U.S. Cl. .................................... 396/111
(58) Field of Classification Search ................. 396/111, 396/114
See application file for complete search history.

(56) References Cited

U.S. PATENT DOCUMENTS

| 6,781,632 B1 * | 8/2004 | Ide | 348/345 |
|---|---|---|---|
| 6,816,360 B2 * | 11/2004 | Brooksby et al. | 361/667 |
| 6,829,008 B1 * | 12/2004 | Kondo et al. | 348/302 |
| 6,906,751 B1 * | 6/2005 | Norita et al. | 348/349 |
| 7,154,547 B2 * | 12/2006 | Oda | 348/277 |
| 2007/0154200 A1 * | 7/2007 | Utagawa et al. | 396/111 |
| 2007/0236598 A1 * | 10/2007 | Kusaka | 348/350 |

FOREIGN PATENT DOCUMENTS

JP   A 1-216306   8/1989

\* cited by examiner

*Primary Examiner*—W. B. Perkey
(74) *Attorney, Agent, or Firm*—Oliff & Berridge, PLC

(57) ABSTRACT

An image sensor includes imaging pixels that convert an image formed via an optical system to image signals and a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method. An image detection pitch of the first focus detection pixel group and an image detection pitch of the second focus detection pixel group are different from each other.

25 Claims, 31 Drawing Sheets

FIG.23

| B 1 | G 1 | B 2 | G 2 | B 3 |
|---|---|---|---|---|
| G 3 | R 1 | G 4 | R 2 | G 5 |
| A F 1 | A F 2 | A F 3 | A F 4 | A F 5 |
| G 6 | R 3 | G 7 | R 4 | G 8 |
| B 4 | G 9 | B 5 | G 1 0 | B 6 |

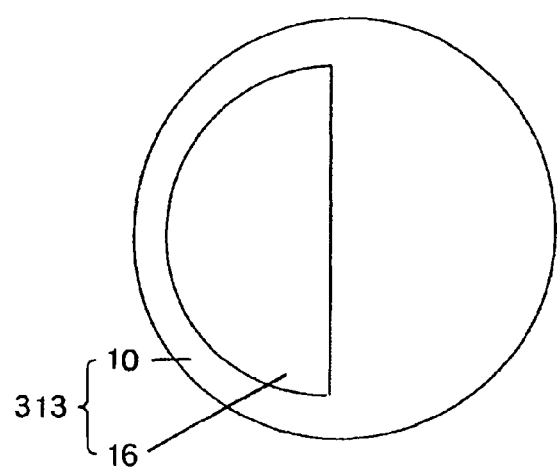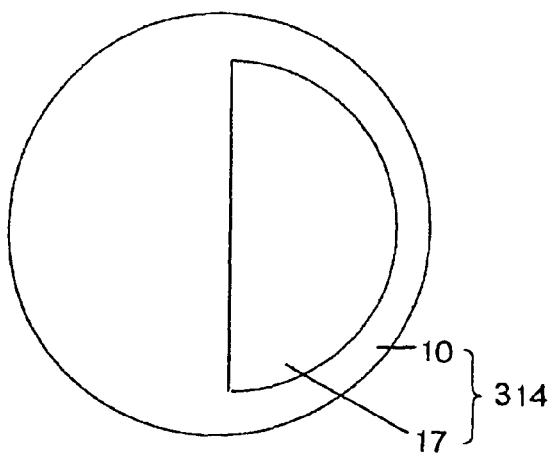

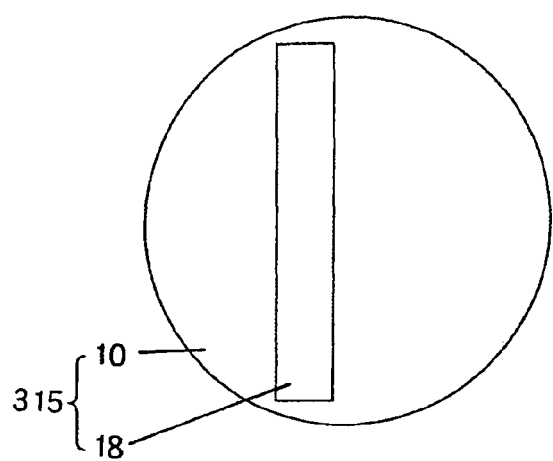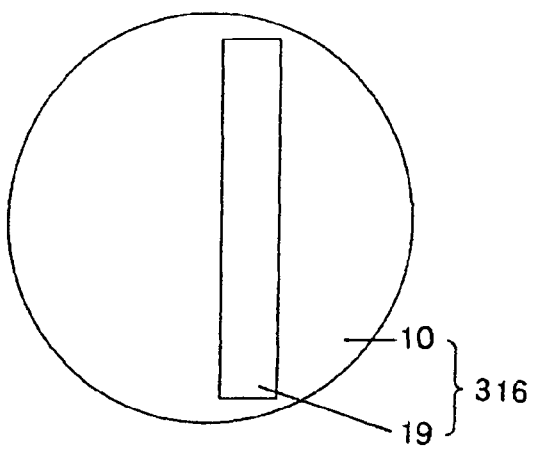

IMAGE SENSOR, IMAGING DEVICE AND IMAGING METHOD

INCORPORATION BY REFERENCE

The disclosure of the following priority application is herein incorporated by reference:

Japanese Patent Application No. 2006-104402 filed Apr. 5, 2006

BACKGROUND OF THE INVENTION

1. Field of the Invention

The present invention relates to an image sensor that includes a plurality of imaging pixels and a plurality of pupil division-type focus detection pixels arrayed on a single substrate, an image sensor as a photoelectric conversion element, an imaging device equipped with the image sensor and the imaging method.

2. Description of the Related Art

There is an imaging device known in the related art equipped with an image sensor having imaging pixels and pupil division-type focus detection pixels disposed together on a single substrate, which captures an image formed on the image sensor and also detects the focus adjustment state of the image (see Japanese Laid Open Patent Publication No. H01-216306).

The following problems arise in the imaging device in the related art described above, which detects the focus adjustment state based upon the image shift amount between a pair of images detected through the pupil division-type method. Namely, in order to assure highly accurate detection of the focus adjustment state in the range around the image focus match position, the focus detection pixels should be disposed densely so as to set a short (fine) image detection pitch. At the same time, the focus detection pixels should be arrayed over a long range to enable detection of a large image shift amount between the pair of images when the image is greatly defocused from the focus match position (hereafter may also be referred to as large defocusing) by assuring a sufficient image shift amount margin. In short, the focus detection pixels should be disposed densely over a long row in order to assure both highly accurate focus detection and detection of a large defocus amount.

For the image sensor to provide high quality image signals, pixel signals at the focus detection pixel positions should be interpolated based upon the signals from the surrounding imaging pixels. This means that the likelihood of a significant interpolation error is bound to be high when interpolating (correcting) pixel signals at positions taken up by the individual focus detection pixels, which are disposed densely over a long range, based upon the signals from the surrounding imaging pixels.

SUMMARY OF THE INVENTION

According to the 1st aspect of the invention, an image sensor comprises imaging pixels that convert an image formed via an optical system to image signals, and a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method. An image array pitch with which the image is detected via the first focus detection pixel group and an image detection pitch with which the image is detected via the second focus detection pixel group are different from each other.

In the image sensor, an array pitch at which the first focus detection pixels may be disposed in the first focus detection pixel group and an array pitch at which the second focus detection pixels may be disposed in the second focus detection pixel group are different from each other.

The second focus detection pixel group may range over a greater length than the first focus detection pixel group. An array direction of the first focus detection pixel group and an array direction of the second focus detection pixel group may match each other.

The first focus detection pixel group and the second focus detection pixel group may be set in close proximity to each other, or may be set along a single straight line.

The second focus detection pixel group can be disposed at an end of the first focus detection pixel group.

The first focus detection pixels and the second focus detection pixels may have sensitivity over a wider wavelength range than pixels other than the first focus detection pixels and the second focus detection pixels.

The first focus detection pixels and the second focus detection pixels can be each constituted with a micro-lens and a photoelectric conversion unit.

The photoelectric conversion unit may be formed so as to allow the pair of areas at the exit pupil of the optical system to partially overlap.

An interval between gravitational centers of the pair of areas at the exit pupil of the optical system, which corresponds to the first focus detection pixels, and an interval between gravitational centers of the pair of areas at the exit pupil of the optical system, which corresponds to the second focus detection pixels, may be different from each other.

The first focus detection pixels and the second focus detection pixels may each detect a pair of images formed with light fluxes passing through a pair of areas at an exit pupil of the optical system.

According to the 2nd aspect of the invention, an image sensor comprises an imaging pixel group made up with pixels that convert an image formed via an optical system to image signals, formed by arraying a plurality of pixel sets each constituted with a plurality of pixels with sensitivity to different colors, and a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method. An image detection pitch with which the image is detected via the second focus detection pixel group is larger than an image detection pitch with which the image is detected via the first focus detection pixel group. The first focus detection pixel group and the second focus detection pixel group are disposed at positions corresponding to pixels sensitive to a color with low luminosity factor in the pixel sets each constituted with a plurality of pixels.

The pixel sets may each include a plurality of pixels sensitive to red, green and blue disposed in a Bayer array, and the first focus detection pixel group and the second focus detection pixel group are disposed at positions corresponding to pixels with sensitivity to blue and green in a two-dimensional array of the imaging pixels.

According to the 3rd aspect of the invention, an image sensor comprises imaging pixels that convert an image formed via an optical system to image signals, and a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method. An image detection pitch with which the image is detected via the second focus detection pixel group is larger than an image detection pitch with which the image is detected via the first focus detection pixel group. The first focus detection pixels and the second focus detection pixels each detect a pair of images formed with light fluxes passing through a pair of areas at an exit pupil of the optical system, and an interval between gravitational centers of the pair of areas at the exit pupil of the optical system, which correspond to the second focus detection pixels, is shorter than an interval between gravitational centers of the pair of areas at the exit pupil of the optical system, which corresponds to the first focus detection pixels.

According to the 4th aspect of the invention, an image sensor comprises imaging pixels that convert an image formed via an optical system to image signals, and a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method. An image detection pitch with which the image is detected via the second focus detection pixel group is larger than an image detection pitch with which the image is detected via the first focus detection pixel group. A width over which the pair of areas at the exit pupil of the optical system, which correspond to the second focus detection pixels, range along a direction in which pupils are set side-by-side is smaller than a width over which the pair of areas at the exit pupil of the optical system, which correspond to the first focus detection pixels, range along the direction in which pupils are set side-by-side.

According to the 5th aspect of the invention, an image sensor comprises imaging pixels that convert an image formed via an optical system to image signals, and a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method. An image detection pitch with which the image is detected via the second focus detection pixel group is larger than an image detection pitch with which the image is detected via the first focus detection pixel group. The first focus detection pixels and the second focus detection pixels each include a photoelectric conversion unit disposed at a position further toward one side relative to a pixel center portion.

According to the 6th aspect of the invention, an imaging device comprises an image sensor that includes imaging pixels that convert an image formed via an optical system to image signals and a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method, and a focus detection unit that detects the focus adjustment state at the optical system based upon outputs from the first focus detection pixel group and the second focus detection pixel group. An image detection pitch with which the image is detected via the first focus detection pixel group and an image detection pitch with which the image is detected via the second focus detection pixel group are different from each other.

The focus detection unit may select one of an output from the first focus detection pixel group and an output from the second focus detection pixel group in correspondence to the focus adjustment state. The imaging device may further comprise a pixel output generation unit that generates pixel outputs in correspondence to positions of the first focus detection pixels and the second focus detection pixels based upon outputs from pixels surrounding the first focus detection pixels and the second focus detection pixels.

According to the 7th aspect of the invention, an image sensor comprises a first focus detection pixel group made up with an array of first focus detection pixels each equipped with a first photoelectric conversion unit at which an image light flux via an optical system is received so as to detect a focus adjustment state at the optical system through a pupil division-type method based upon an output from the first photoelectric conversion unit, and a second focus detection pixel group made up with an array of second focus detection pixels each equipped with a second photoelectric conversion unit different from the first photoelectric conversion unit so as to detect the focus adjustment state at the optical system through a pupil division-type method based upon an output from the second photoelectric conversion unit.

An image detection pitch with which the image is detected via the second focus detection pixel group can be larger than an image detection pitch at which the image is detected via the first focus detection pixel group.

An array pitch at which the second focus detection pixels may be disposed in the second focus detection pixel group is larger than an array pitch at which the first focus detection pixels are disposed in the first focus detection pixel group.

According to the 8th aspect of the invention, an imaging method comprises providing an image sensor that includes imaging pixels that convert an image formed via an optical system to image signals, providing in the image sensor a first focus detection pixel group and a second focus detection pixel group respectively made up with an array of first focus detection pixels and an array of second focus, detection pixels, with the first focus detection pixels and the second focus detection pixels used to receive an image light flux via the optical system to detect a focus adjustment state at the optical system through a pupil division-type method, detecting the focus adjustment state at the optical system based upon outputs from the first focus detection pixel group and the second focus detection pixel group, and setting an image detection pitch with which the image is detected via the first focus detection pixel group and an image detection pitch with which the image is detected via the second focus detection pixel group differently from each other.

According to the 9th aspect of the invention, an imaging method comprises providing an image sensor that includes an imaging pixel group made up with pixels that convert an image formed via an optical system to image signals, which is formed by arraying a plurality of pixel sets each constituted with a plurality of pixels with sensitivity to different colors, providing in the image sensor a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method, detecting the focus adjustment state at the optical system based upon outputs from the first focus detection pixel group and the second focus detection pixel group, and setting the first focus detection pixel group and the second focus detection pixel group at the image sensor so that an image detection pitch at which the image is detected via the second focus detection pixel group is larger than an image detection pitch at which the image is detected via the first focus detection pixel group, at positions corresponding to pixels sensitive to a color with low luminosity factor in the pixel sets, each constituted with a plurality of pixels.

According to the 10th aspect of the invention, an imaging method comprises providing an image sensor that includes imaging pixels that convert an image formed via an optical system to image signals, providing in the image sensor a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method, detecting the focus adjustment state at the optical system based upon outputs from the first focus detection pixel group and the second focus detection pixel group, generated by detecting via each of the first focus detection pixels and the second focus detection pixels a pair of images formed with light fluxes passing through a pair of areas at an exit pupil of the optical system, setting the first focus detection pixel group and the second focus detection pixel group at the image sensor so that an image detection pitch with which the image is detected via the second focus detection pixel group is larger than an image detection pitch with which the image is detected via the first focus detection pixel group, and making an interval between gravitational centers of the pair of areas at the exit pupil of the optical system, which correspond to the second focus detection pixels shorter than an interval between gravitational centers of the pair of areas at the exit pupil of the optical system, which corresponds to the first focus detection pixels.

According to the 11th aspect of the invention, an imaging method comprises providing an image sensor that includes imaging pixels that convert an image formed via an optical system to image signals, providing in the image sensor a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method, detecting the focus adjustment state at the optical system based upon outputs from the first focus detection pixel group and the second focus detection pixel group, setting the first focus detection pixel group and the second focus detection pixel group at the image sensor so that an image detection pitch with which the image is detected via the second focus detection pixel group is larger than an image detection pitch with which the image is detected via the first focus detection pixel group, and disposing the first focus detection pixels and the second focus detection pixels so that a width over which the pair of areas at the exit pupil of the optical system, which correspond to the second focus detection pixels, range along a direction in which pupils are set side-by-side is smaller than a width over which the pair of areas at the exit pupil of the optical system, which correspond to the first focus detection pixels, range along the direction in which the pupils are set side-by-side.

According to the 12th aspect of the invention, an imaging method comprises providing an image sensor that includes imaging pixels that convert an image formed via an optical system to image signals, providing in the image sensor a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method, detecting a focus adjustment state at the optical system based upon outputs from the first focus detection pixel group and the second focus detection pixel group, disposing the first focus detection pixel group and the second focus detection pixel group at the image sensor so that an image detection pitch with which the image is detected via the second focus detection pixel group is larger than an image detection pitch with which the image is detected via the first focus detection pixel group and providing a photoelectric conversion unit disposed at a position further toward one side relative to a pixel center portion in the first focus detection pixels and the second focus detection pixels.

BRIEF DESCRIPTION OF THE DRAWINGS

FIG. 23 shows the positional arrangement adopted for the first focus detection pixel row (AF 1-AF 5) and the surrounding imaging pixels (blue pixels B1-B6, red pixels R1-R4 and green pixels G1-G10);

FIGS. 25A and 25B show first focus detection pixels in a variation;

FIGS. 27A and 27B show second focus detection pixels in a variation;

DETAILED DESCRIPTION OF THE PREFERRED EMBODIMENTS

An explanation is now given on an embodiment by adopting the present invention in a digital still camera. It is to be toted that the present invention may also be effectively adopted in a compact digital camera, a video camera, a compact camera module built into a portable telephone and the like, as well as in a digital still camera. In addition, the present invention may be adopted in a camera with an integrated lens, instead of a camera with an exchangeable lens mounted at the camera body.

Figure 1:
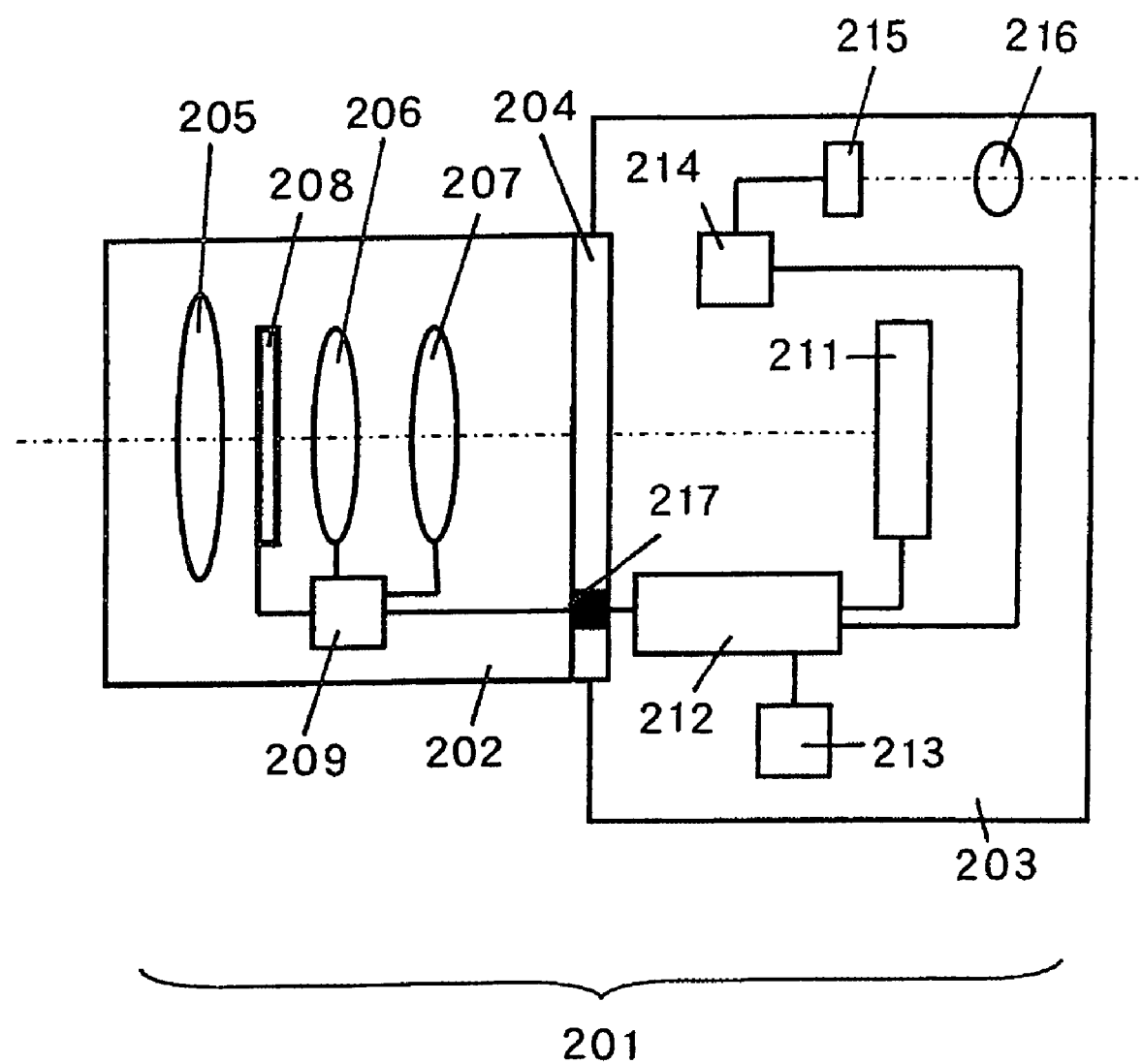
FIG. 1 shows the structure of the digital still camera in an embodiment of the present invention.

FIG. 1 shows the structure of the digital still camera in the embodiment. The digital still camera 201 in the embodiment comprises an exchangeable lens unit 202 and a camera body 203. The exchangeable lens unit 202 is mounted on a mount unit 204 at the camera body 203.

The exchangeable lens unit 202 includes lenses 205-207, an aperture 208 and a lens drive control device 209. It is to be noted that the lens 206 is a zooming lens and that the lens 207 is a focusing lens. The lens drive control device 209, constituted with a CPU and its peripheral components, controls the drive of the focusing lens 207 and the aperture 208, detects the positions of the zooming lens 206, the focusing lens 207 and the aperture 208 and transmits lens information and receives camera information by communicating with a control device in the camera body 203.

An image sensor 211, a camera drive control device 212, a memory card 213, an LCD driver 214, an LCD 215, an eyepiece lens 216 and the like are mounted at the camera body 203. The image sensor 211, set at the estimated image forming plane (estimated focal plane) of the exchangeable lens unit 202, captures a subject image formed through the exchangeable lens unit 202 and outputs image signals. At the image sensor 211, pixels used for imaging (hereafter simply referred to as imaging pixels) are disposed two-dimensionally, and rows of pixels used for focus detection (hereafter simply referred to as focus detection pixels), instead of imaging pixels, are disposed in the two-dimensional array over areas corresponding to focus detection positions. It is to be noted that the image sensor 211 may be a CCD image sensor or a CMOS image sensor.

The camera drive control device 212, constituted with a CPU and its peripheral components, controls the drive of the image sensor 211, processes the captured image, executes focus detection and focus adjustment for the exchangeable lens unit 202, controls the aperture 208, controls display operation at the LCD 215, communicates with the lens drive control device 209 and controls the overall operational sequence in the camera. It is to be noted that the camera drive control device 212 communicates with the lens drive control device 209 via an electrical contact point 217 at the mount unit 204.

The memory card 213 is an image storage device in which captured images are stored. The LCD 215 is used as a display unit of a liquid crystal viewfinder (EVF: electronic viewfinder). The photographer is able to visually check a captured image displayed at the LCD 215 via the eyepiece lens 216.

The subject image formed on the image sensor 211 after passing through the exchangeable lens unit 202 undergoes photoelectric conversion at the image sensor 211 and the post-photoelectric conversion output is provided to the camera drive control device 212. The camera drive control device 212 determines through arithmetic operation the defocus amount at a focus detection position based upon the outputs from the focus detection pixels and transmits the defocus amount to the lens drive control device 209. In addition, the camera drive control device 212 provides image signals generated based upon the outputs from the imaging pixels to the LCD driver 214 so as to display the captured image at the LCD 215 and also stores the image signals into the memory card 213.

The lens drive control device 209 detects the positions of the zooming lens 206, the focusing lens 207 and the aperture 208 and obtains through arithmetic operation the lens information based upon the detected positions. It is to be noted that the lens information corresponding to the detected positions may be selected from a lookup table prepared in advance. The lens information is then provided to the camera drive control device 212. In addition, the lens drive control device 209 calculates a lens drive amount indicating the extent to which the lens is to be driven based upon the defocus amount received from the camera drive control device 212, and controls the drive of the focusing lens 207 based upon the lens drive amount.

Figure 2:
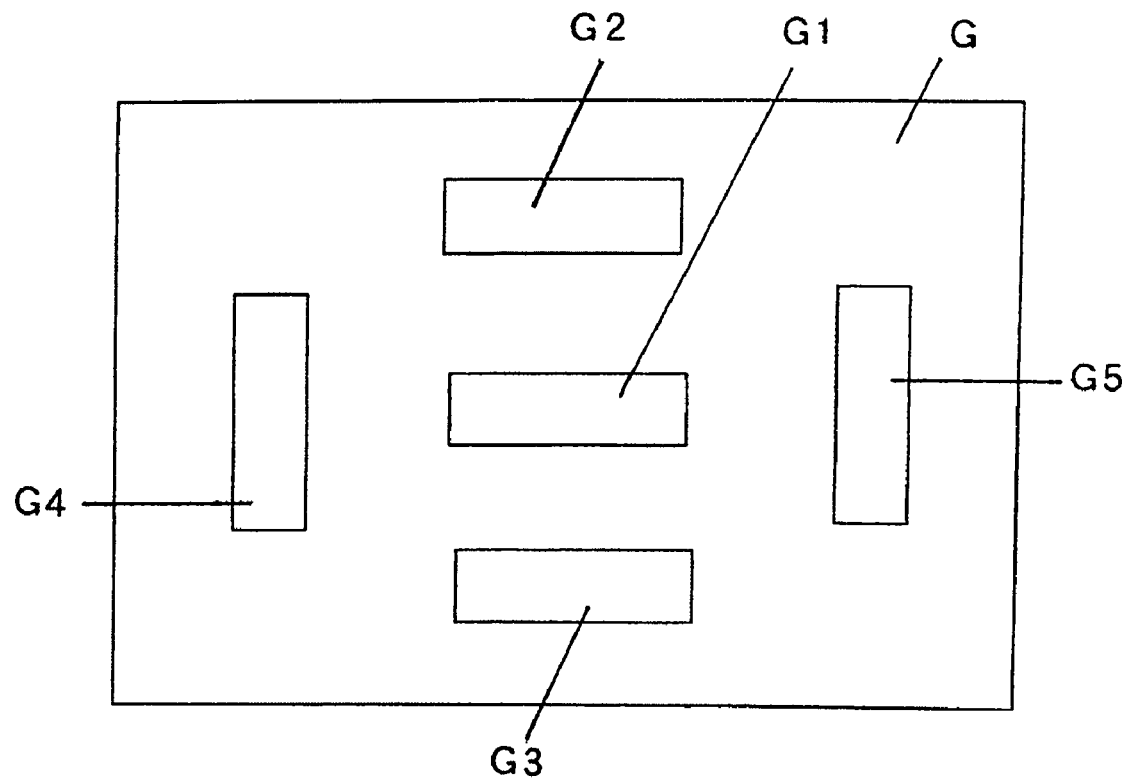
FIG. 2 shows the focus detection areas on the imaging plane set on the estimated image forming plane of the exchangeable lens.

FIG. 2 shows focus detection areas on an imaging plane G set on the estimated image forming plane of the exchangeable lens unit 202. Focal point detection areas G1~G5 are set on the imaging plane G and the focus detection pixels are arrayed at the image sensor 211 in correspondence to the focus detection areas G1-G5. Namely, focus detection pixel rows on the image sensor 211 sample the image portions in the focus detection areas G1-G5 within the subject image formed on the photographic image plane G. It is to be noted that a first focus detection pixel row to be used for high-accuracy focus detection and a second focus detection pixel row used for large defocusing detection are set within each focus detection area.

Figure 3:
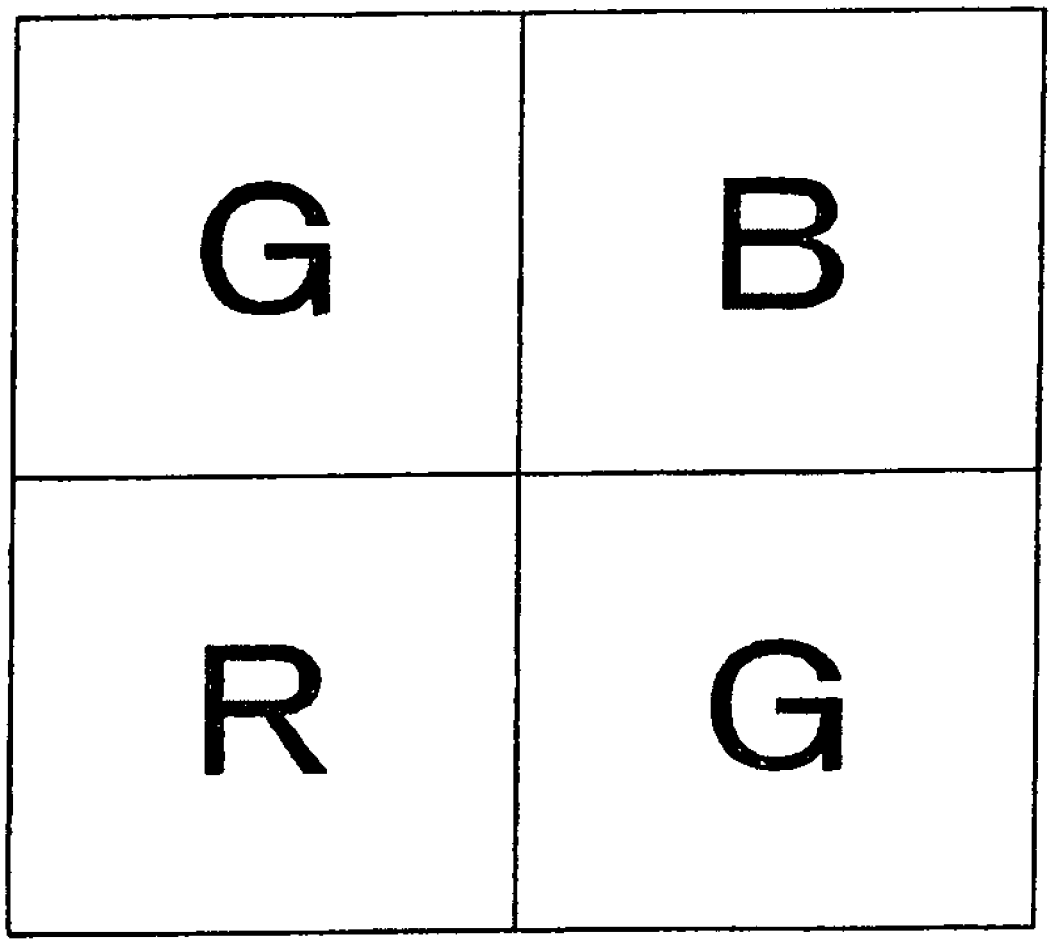
FIG. 3 shows the arrangement of color filters disposed at the image sensor.
Figure 4:
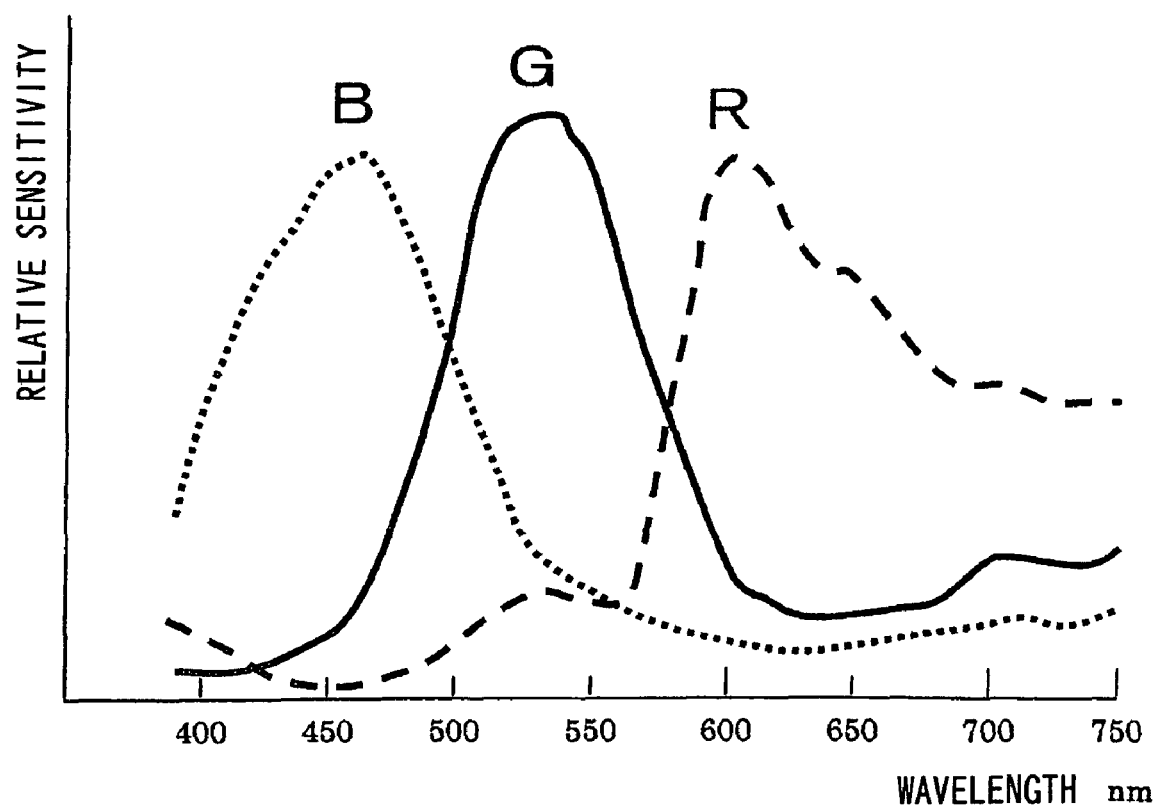
FIG. 4 shows the sensitivity characteristics of the imaging pixels each having a primary color filter corresponding to one of the three primary colors R, G and B, disposed thereat.
Figure 5:
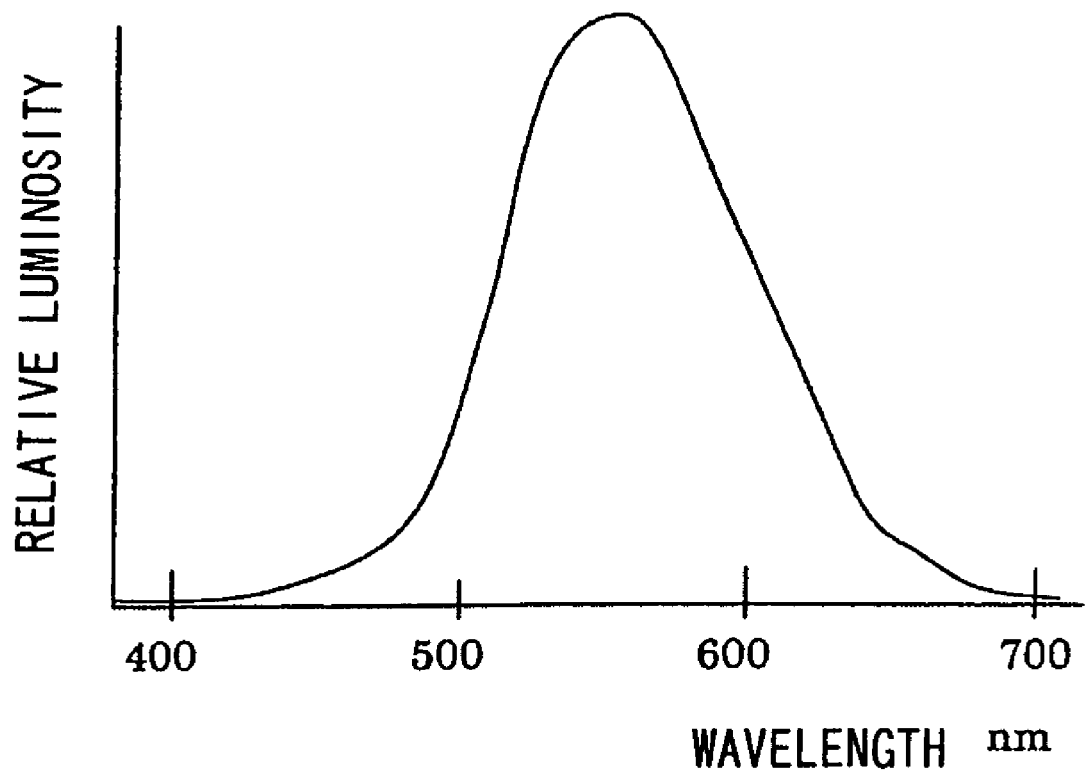
FIG. 5 shows the relative luminosity of G filter pixels.

FIG. 3 shows the positional arrangement of color filters disposed at the image sensor 211. Color filters in a Bayer array, as shown in FIG. 3, are each disposed at one of the imaging pixels arrayed two-dimensionally on the substrate of the image sensor 211. It is to be noted that while FIG. 3 shows the color filter positional arrangement corresponding to a four-pixel imaging area, this imaging pixel unit adopting the color filter positional arrangement over the four-pixel area is two-dimensionally reiterated. The imaging pixels each equipped with a primary color filter corresponding to one of the primary colors R (red), G (green) and B (blue) have sensitivity characteristics such as those shown in FIG. 4. In this Bayer array, two pixels each equipped with a G filter with sensitivity close to the peak of the relative luminosity shown in FIG. 5 are disposed diagonally across from each other and pixels, one equipped with a B filter and the other with an R filter, are disposed diagonally across from each other.

Figure 6:
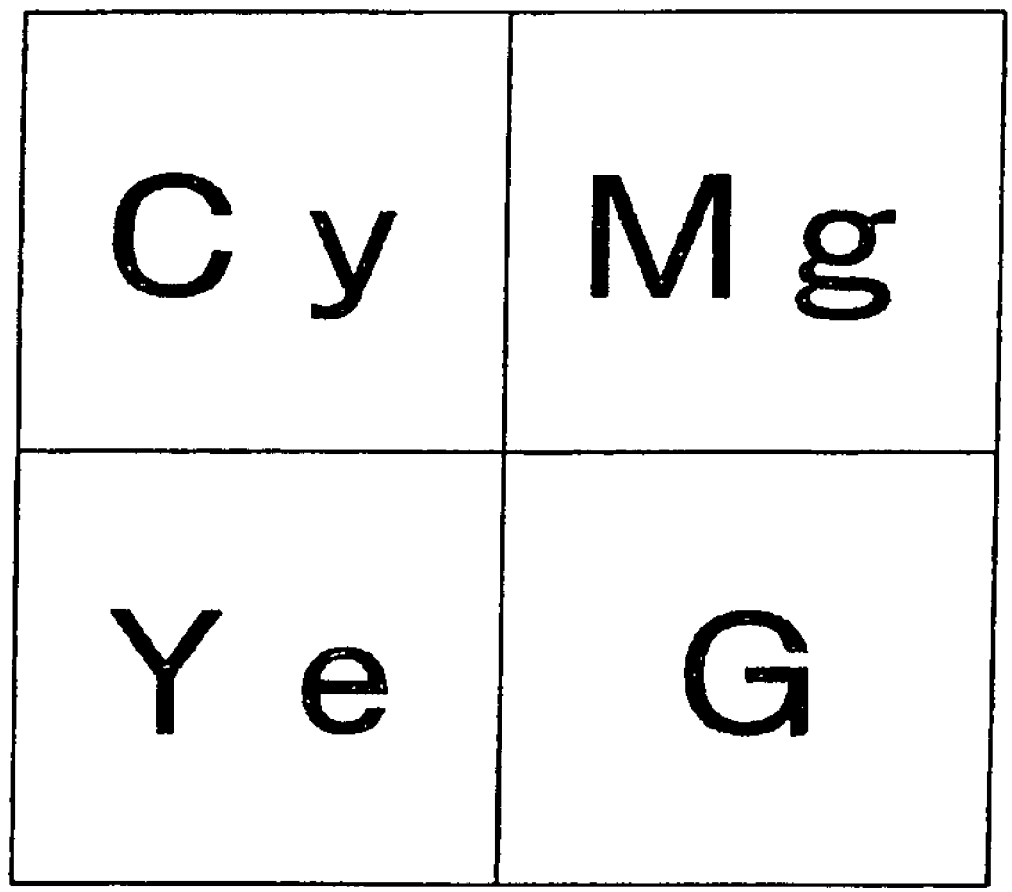
FIG. 6 shows an arrangement that may be adopted for complementary color filters.

It is to be noted that the color filters may be arranged in an array other than the Bayer array shown in FIG. 3. For instance, an imaging pixel unit that includes complementary color filters, i.e., a G (green) filter, a Ye (yellow) filter, an Mg (magenta) filter and a Cy (cyan) filter, as shown in FIG. 6, may be reiterated two-dimensionally.

Figure 7:
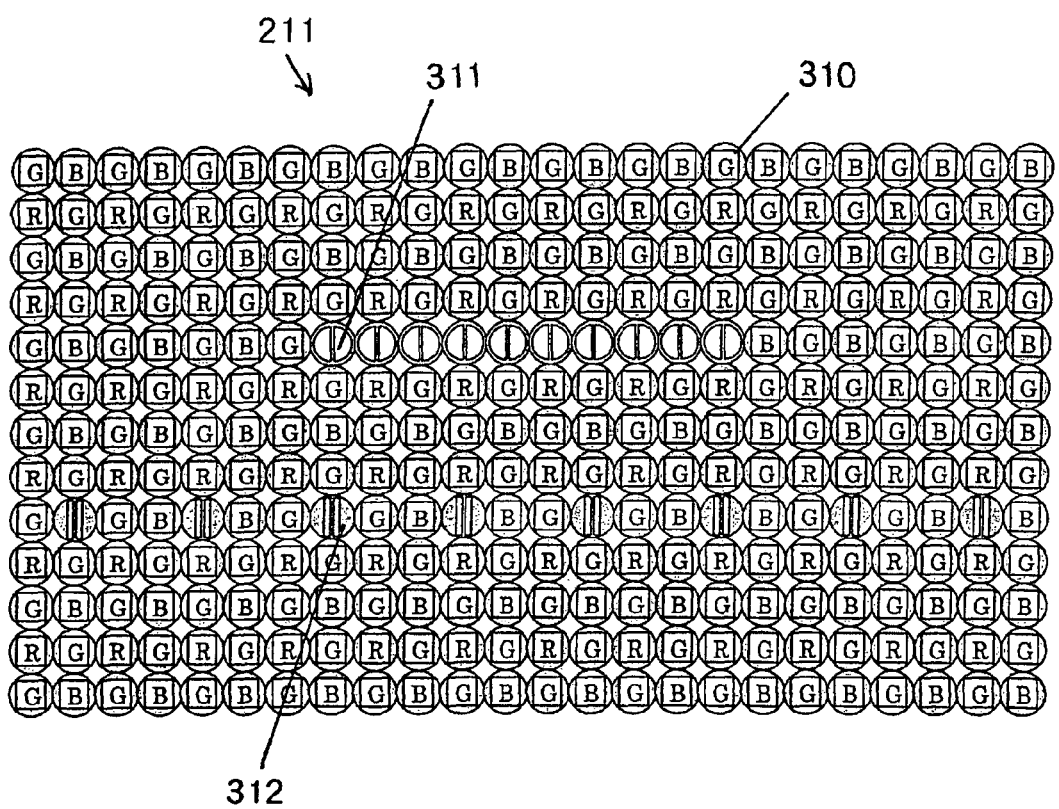
FIG. 7 is a front view, showing in detail the structure of the image sensor.

FIG. 7 is a front view showing in detail the structure of the image sensor 211. It is to be noted that FIG. 7 shows part of the image sensor 211, near a given focus detection area set on the image sensor 211, in an enlargement. At the image sensor 211, imaging pixels 310 each equipped with a color filter corresponding to R, G or B are two-dimensionally disposed so as to compose the Bayer array in FIG. 3. In addition, at each of the positions corresponding to the focus detection areas G1-G5 in FIG. 2, first focus detection pixels 311 used for high-accuracy focus detection and second focus detection pixels 312 used for large defocusing detection, instead of the imaging pixels 310, are disposed.

Figure 8:
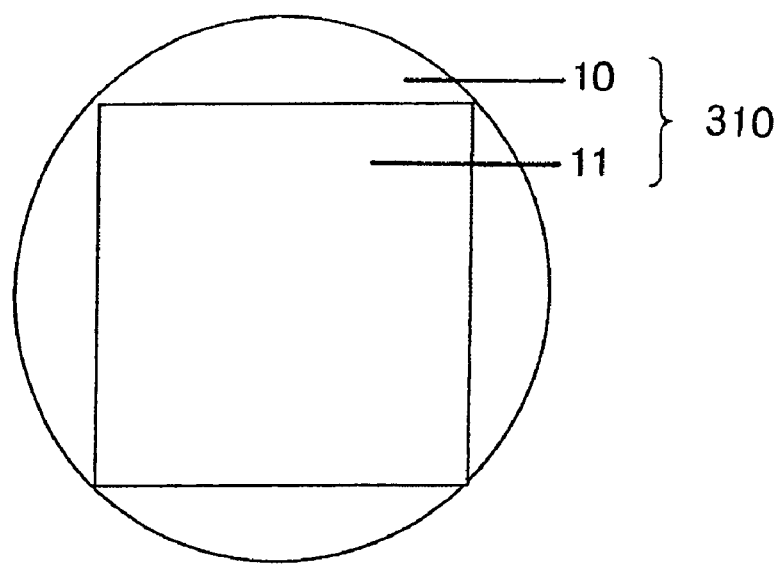
FIG. 8 shows an imaging pixel in an enlargement.
Figure 9:
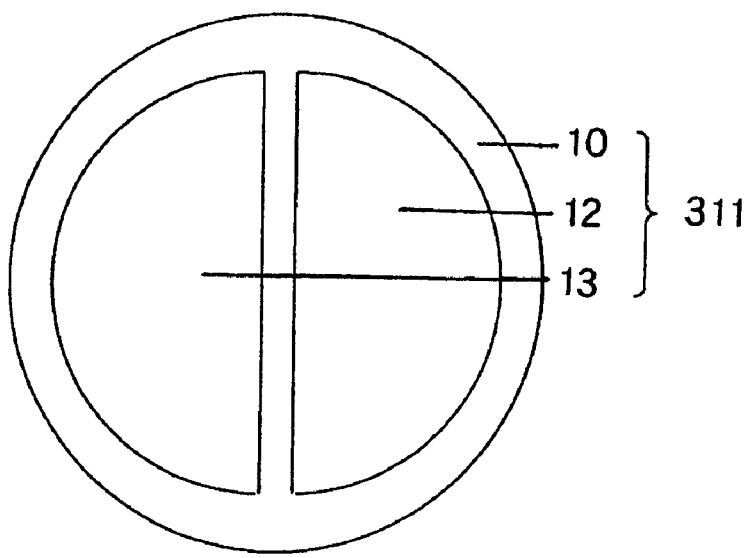
FIG. 9 shows a first focus detection pixel in an enlargement.
Figure 10:
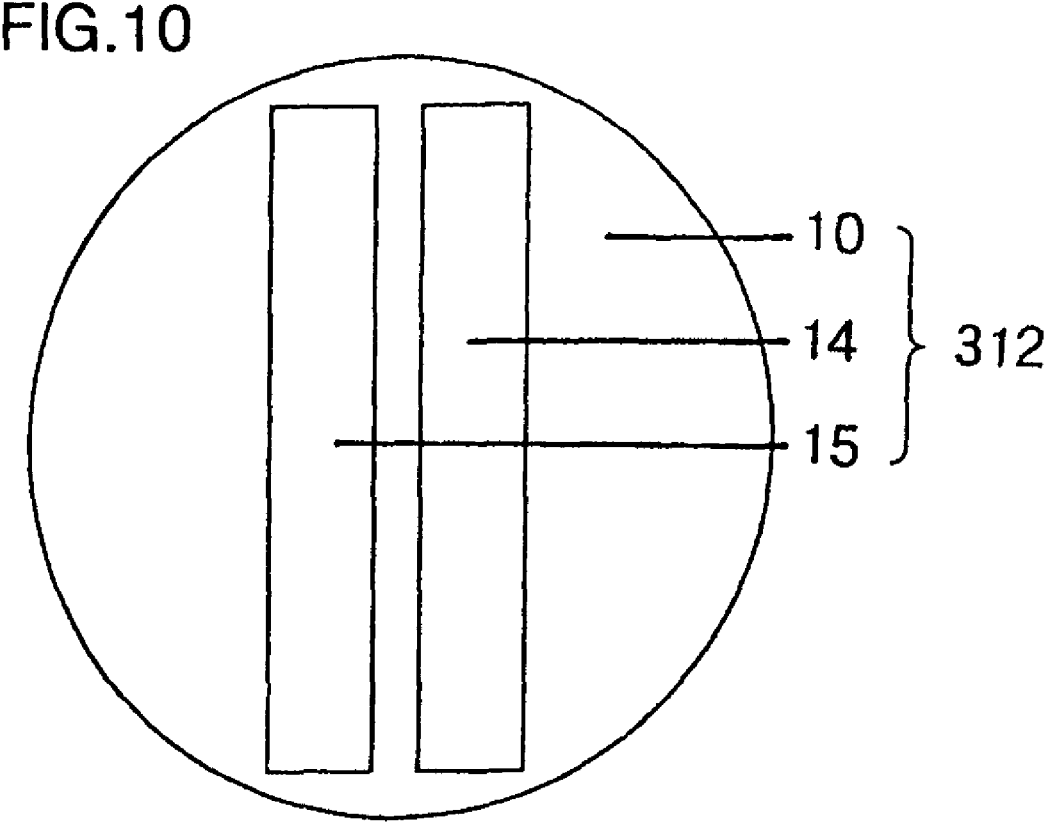
FIG. 10 shows a second focus detection pixel in an enlargement.

FIG. 8 is an enlargement of an imaging pixel 310. The imaging pixel 310 includes a micro-lens 10, a photoelectric conversion unit 11 and a color filter (not shown). FIG. 9 is an enlargement of a first focus detection pixel 311. The first focus detection pixel 311 includes a micro-lens 10, a pair of photoelectric conversion units 12 and 13 and a filter (not shown). FIG. 10 is an enlargement of a second focus detection pixel 312. The second focus detection pixel 312 includes a micro-lens 10, a pair of photoelectric conversion units 14 and 15 and a filter (not shown).

Figure 11:
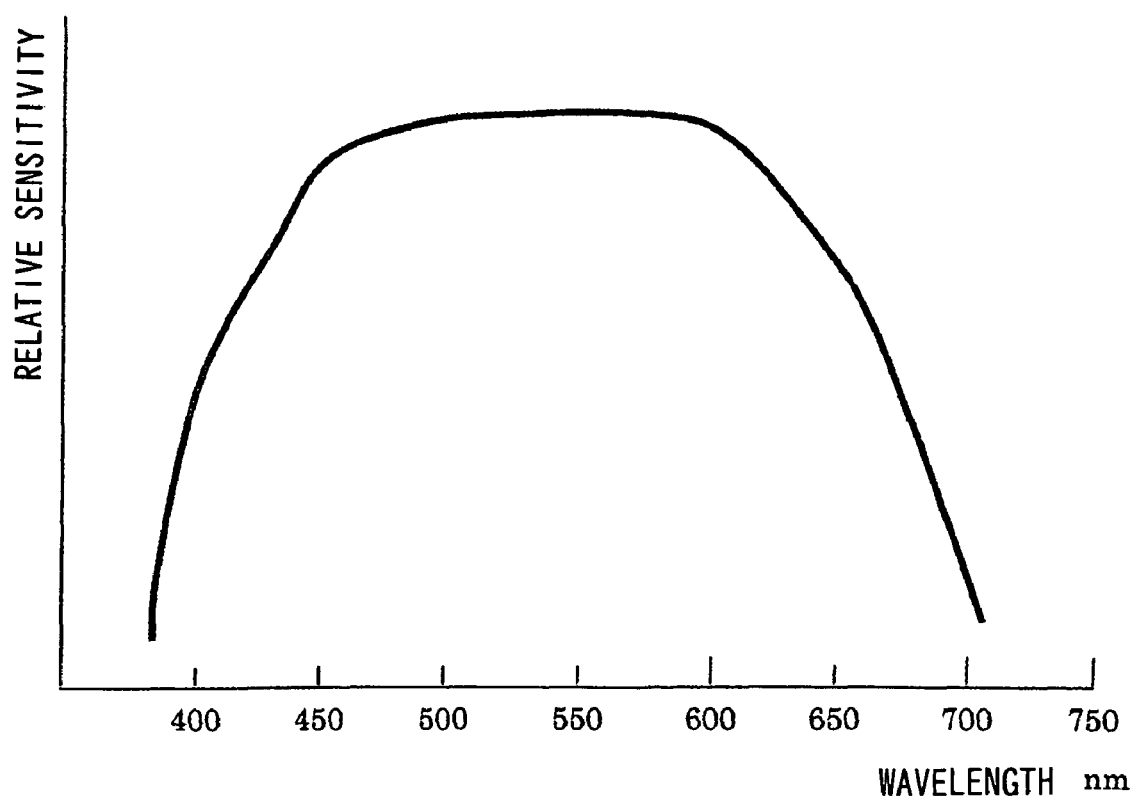
FIG. 11 shows the characteristics of the filters mounted at the first focus detection pixels and the second focus detection pixels.

FIG. 11 shows the characteristics of the filters disposed at the first focus detection pixels 311 and the second focus detection pixels 312. These filters are sensitive in the visible light range but are not sensitive in the ultraviolet range and the infrared range. In other words, a sufficient quantity of light can be assured with better ease in conjunction with these filters even at low brightness levels. In addition, the first focus detection pixels 311 and the second focus detection pixels 312 have a wider range of wavelength sensitivity than the other type of pixels, i.e., the imaging pixels 310, and thus, their focus detection performance remains unaffected by the color of the subject image over the focus detection areas.

As shown in FIG. 8, the photoelectric conversion unit 11 at each imaging pixel 310 is designed in a shape that allows the photoelectric conversion unit to receive all the light flux passing through the exit pupil of the exchangeable lens unit 202 at a light setting, e.g., an exit pupil equivalent to F 1.0, via the micro-lens 10. In addition, the pair of photoelectric conversion units 12 and 13 at each first focus detection pixel 311 is designed in a shape that allows the photoelectric conversion units to receive all the light flux passing through a specific exit pupil of the exchangeable lens unit 202, e.g., an exit pupil equivalent to F 2.8, via the micro-lens 10, as shown in FIG. 9.

In addition, as shown in FIG. 10, the pair of photoelectric conversion units 14 and 15 at each second focus detection pixel 312 are designed in a shape that allows the photoelectric conversion units to receive the light flux passing through an exit pupil corresponding to a higher F value along the direction in which the photoelectric conversion units are set side-by-side, relative to the pair of photoelectric conversion units 12 and 13 at the first focus detection pixel 311 (e.g., an exit pupil equivalent to F 5.6) via the micro-lens 10.

As shown in FIG. 7, the image sensor 211 includes the imaging pixels 310 each equipped with a color filter corresponding to R, G or B arranged so as to reiterate the Bayer array in FIG. 3, and the first focus detection pixels 311 for high-accuracy focus detection and the second focus detection pixels 312 for large defocusing detection disposed over an area corresponding to each of the positions of the focus detection areas G1-G5 shown in FIG. 2. The first focus detection pixels 311 for high-accuracy focus detection are densely disposed in a straight horizontal row (in a vertical row in each of the focus detection areas G4 and G5), which would otherwise be taken up by imaging pixels 310 equipped with B filters and G filters, without allowing any intervals between the individual first focus detection pixels.

The second focus detection pixels 312 used for large defocusing detection, on the other hand, are disposed in close proximity to the first focus detection pixels 311 for high-accuracy focus detection, in a straight horizontal row (in a vertical row in each of the focus detection areas G4 and G5), which would otherwise be taken up by imaging pixels 310 equipped with B filters and G filters, by allowing two-pixel intervals between the individual second focus detection pixels.

It is desirable that the image at a single position in the imaging plane G be sampled via the pixel row made up with the second focus detection pixels 312 for large defocusing detection and via the pixel row made up with the first focus detection pixels 311 for high-accuracy focus detection, so as to improve the focus detection accuracy. From this viewpoint, it would be ideal to dispose the two pixel rows adjacent to each other to improve the focus detection accuracy to the maximum extent. However, such a positional arrangement would compromise the accuracy of interpolation executed to interpolate outputs of the focus detection pixels based upon the outputs from the imaging pixels present around the focus detection pixels. Namely, the positional arrangement with the two pixel rows set adjacent to each other would lead to a significant interpolation error. From this perspective, the two pixel rows should be set apart from each other with at least a three-pixel interval in order to assure better quality for the captured image. While the two pixel rows are set apart from each other over a three-pixel interval in the example presented in FIG. 7, the two pixel rows can be regarded to sample the image at a single position within the imaging plane since the pixels themselves are extremely small.

The following advantage is obtained by disposing the first focus detection pixels 311 and the second focus detection pixels 312 along the horizontal (or vertical) rows that would otherwise be taken up by imaging pixels 310 equipped with B filters and G filters. Namely, even if a slight error occurs when generating pixel signals at the first focus detection pixels 311 and the second focus detection pixels 312 through pixel interpolation to be detailed later, the error is more or less unnoticeable to the human eye, since the human eye is more perceptive to red than to blue, and the green pixels disposed with higher density compared to the blue pixels and the red pixels have a lower defect contribution factor per pixel.

Figure 12A:
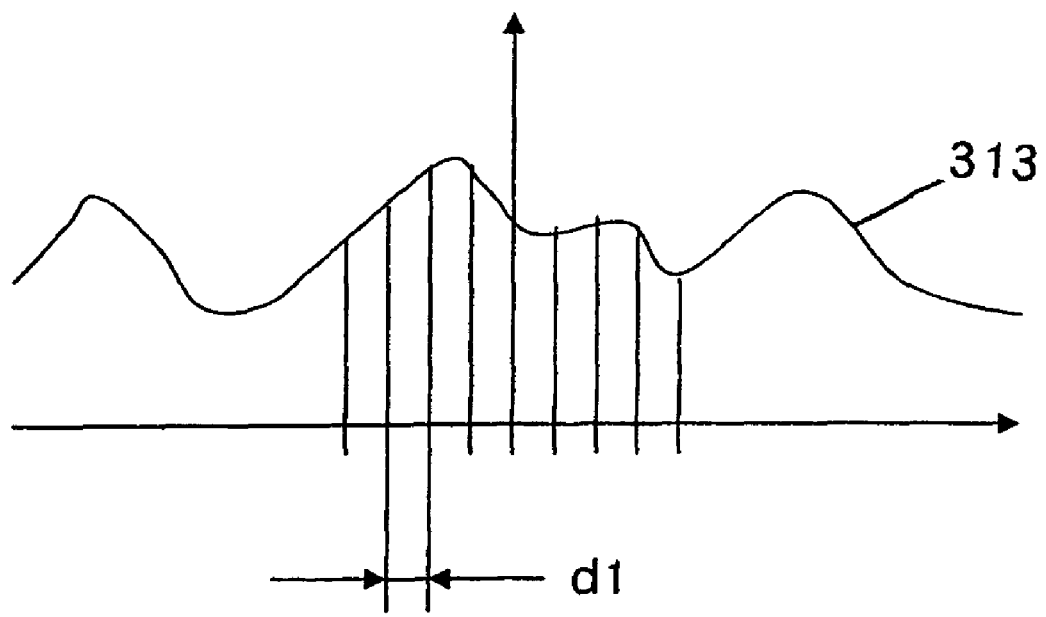
FIGS. 12A and 12B show how an image formed on the image sensor is sampled via the first focus detection pixels and the second focus detection pixels.
Figure 12B:
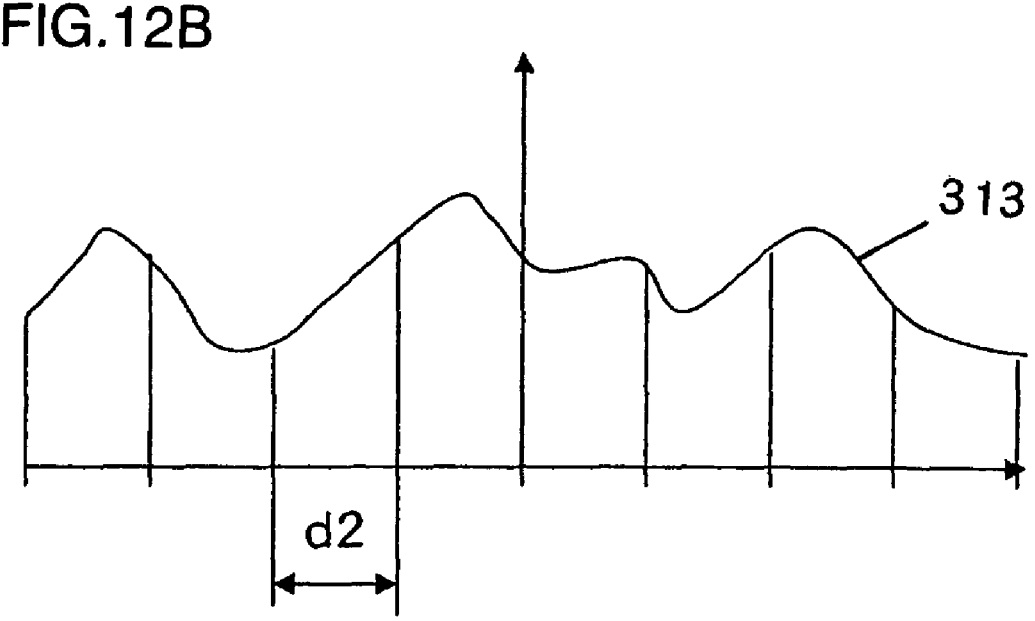

The first focus detection pixels 311 are disposed densely at the center of each of the focus detection areas (G1-G5), whereas the second focus detection pixels 312 are disposed more sparsely over a range greater than the range of the first focus detection pixels 311. FIGS. 12A and 12B show how an image 313 formed on the image sensor 211 is sampled via the first focus detection pixels 311 and the second focus detection pixels 312. In FIGS. 12A and 12B the image intensity is indicated along the vertical axis and the image distribution is indicated along the horizontal axis. As shown in FIG. 12A, the image 313 can be detected with a fine image detection pitch d1 via the row of the first focus detection pixels 311. Via the row of the second focus detection pixels 312, on the other hand, the image 313 is detected over a wider range with an image detection pitch d2, which is larger than the image detection pitch corresponding to the row of the first focus detection pixels 311, as shown in FIG. 12B.

The image detection pitch d2 for the row of the second focus detection pixels 312 is set larger than the image detection pitch d1 set for the row of the first focus detection pixels 311 for the following reasons. Firstly, since any fine image structure will be blurred when the defocusing amount is large, it is useless to detect the image with a fine image detection pitch. Secondly, since each second focus detection pixels 312 is surrounded by imaging pixels, image signals can be generated with better interpolation accuracy to lead to an improved image signal quality. Thirdly, since the number of second focus detection pixels disposed in the row can be reduced by setting the individual second focus detection pixels with intervals, the focus detection calculation to be detailed later can be executed on a smaller scale, which, in turn, improves the response in the focus detection. At the same time, the second focus detection pixels can be disposed over a wide range to enable detection of a large image shift amount.

Figure 13:
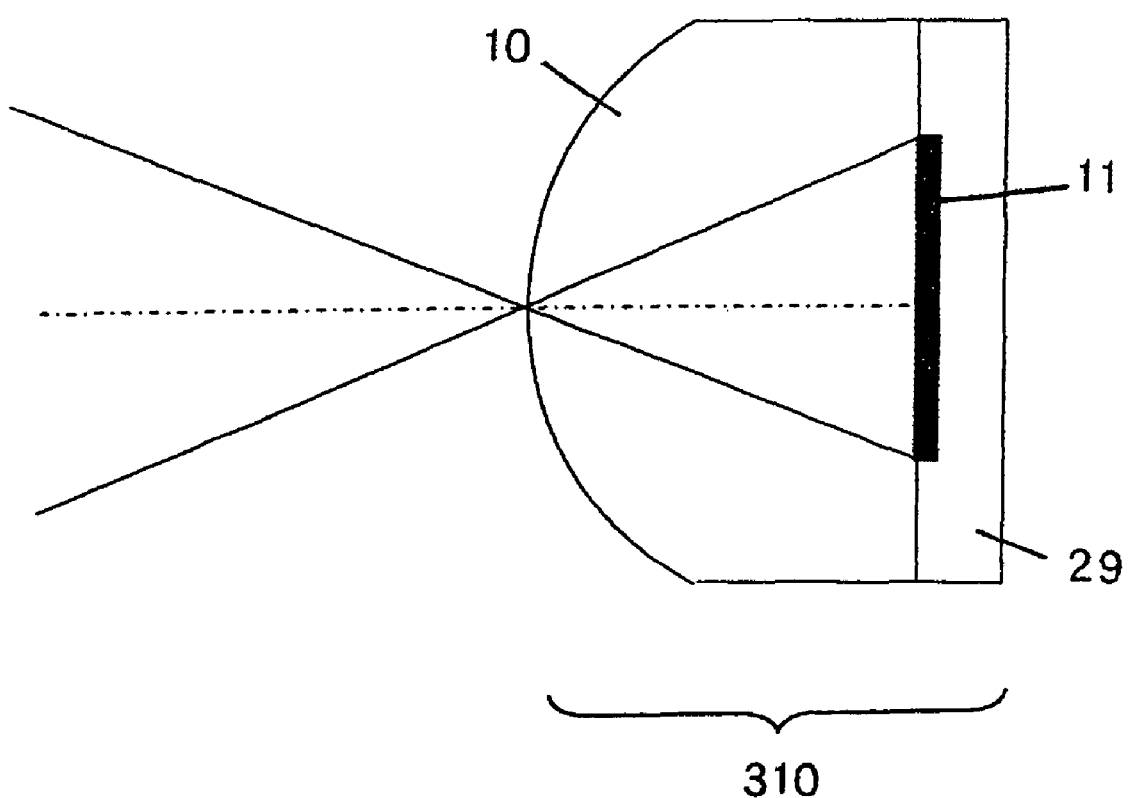
FIG. 13 is a sectional view of an imaging pixel.

FIG. 13 is a sectional view of an imaging pixel 310. The micro-lens 10 is set to the front of the imaging photoelectric conversion unit 11 at the imaging pixel 310 and, as a result, an image of the photoelectric conversion unit 11 is projected frontward via the micro-lens 10. The photoelectric conversion unit 11 is formed on a semiconductor circuit substrate 29, with a color filter (not shown) disposed between the micro-lens 10 and the photoelectric conversion unit 11.

Figure 14:
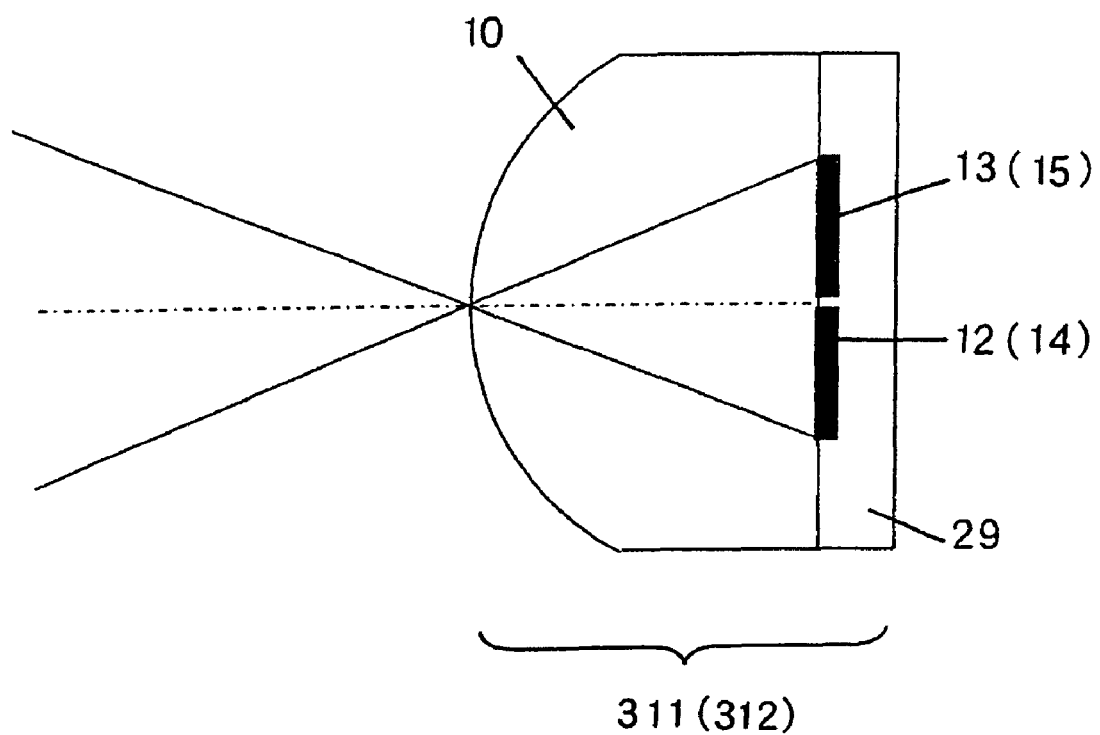
FIG. 14 is a sectional view of a first focus detection pixel or a second focus detection pixel.

FIG. 14 is a sectional view of a first focus detection pixel 311 or a second focus detection pixel 312. The reference numerals inside the parentheses in FIG. 14 and in the following description indicate components of the second focus detection pixel 312. In the first focus detection pixel 311 (second focus detection pixel 312), the micro-lens 10 is disposed to the front of the photoelectric conversion units 12 and 13 (14 and 15) used for focus detection and thus, images of the photoelectric conversion units 12 and 13 (14 and 15) are projected frontward via the micro-lens 10. The photoelectric conversion units 12 and 13 (14 and 15) are formed on the semiconductor circuit substrate 29, with a color filter (not shown) disposed between the micro-lens 10 and the photoelectric conversion units 12 and 13 (14 and 15).

Figure 15:
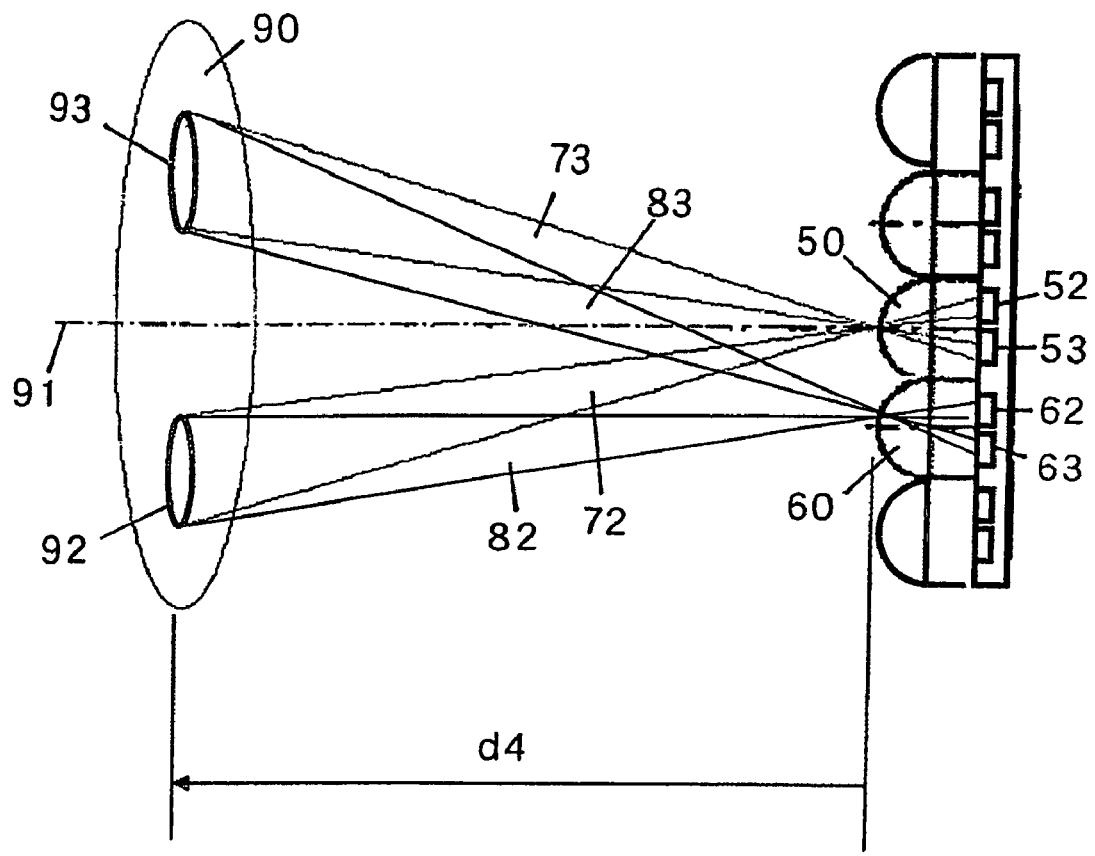
FIG. 15 illustrates focus detection executed through the pupil division-type method.

Next, focus detection executed by adopting a pupil division-type method is explained in reference to FIG. 15. FIG. 15 shows a micro-lens 50 of a first focus detection pixel 311 disposed on an optical axis 91 of the exchangeable lens unit 202, a pair of photoelectric conversion units 52 and 53 disposed to the rear of the micro-lens 50, a micro-lens 60 of a first focus detection pixel 311 disposed off the optical axis 91 of the exchangeable lens unit 202, and a pair of photoelectric conversion units 62 and 63 disposed to the rear of the micro-lens 60. An exit pupil 90 of the exchangeable lens unit 202 is set at a position assumed over a distance d4 to the front of the micro-lenses 50 and 60 disposed on the estimated image forming plane of the exchangeable lens unit 202. The distance d4 takes a value determined in correspondence to the curvature and the refractive index of the micro-lenses 50 and 60, the distance between the micro-lenses 50 and 60 and the photoelectric conversion units 52/53 and 62/63 and the like. In the description, the distance d4 is referred to as a range-finding pupil distance.

The micro-lenses 50 and 60 are set at the estimated image-forming plane of the exchangeable lens unit 202. The shapes of the pair of photoelectric conversion units 52 and 53 are projected via the micro-lens 50 set on the optical axis 91 onto the exit pupil 90 set apart from the micro-lenses 50 by the projection distance d4 and the projected shapes define the range-finding pupils 92 and 93. The shapes of the pair of photoelectric conversion units 62 and 63 are projected via the micro-lens 60 set off the optical axis 91 onto the exit pupil 90 set apart by the projection distance d4 and the projected shapes define range-finding pupils 92 and 93. Namely, the projecting direction for each pixel is determined so that the projected shapes (range-finding pupils 92 and 93) of the photoelectric conversion units in the individual pixels are aligned on the exit pupil 90 set over the projection distance d4.

The photoelectric conversion unit 52 outputs a signal corresponding to the intensity of an image formed on the micro-lens 50 with a focus detection light flux 72 having passed through the range-finding pupil 92 and having advanced toward the micro-lens 50. The photoelectric conversion unit 53 outputs a signal corresponding to the intensity of an image formed on the micro-lens 50 with a focus detection light flux 73 having passed through the range-finding pupil 93 and having advanced toward the micro-lens 50. Also, the photoelectric conversion unit 62 outputs a signal corresponding to the intensity of an image formed on the micro-lens 60 with a focus detection light flux 82 having passed through the range-finding pupil 92 and having advanced toward the micro-lens 60. The photoelectric conversion unit 63 outputs a signal corresponding to the intensity of an image formed on the micro-lens 60 with a focus detection light flux 83 having passed through the range-finding pupil 93 and having advanced toward the micro-lens 60.

By arranging numerous focus detection pixels each structured as described above in a straight row and integrating the outputs from the pairs of photoelectric conversion units into output groups each corresponding to the two range-finding pupils 92 and 93, information related to the intensity distribution of the pair of images formed on the focus detection pixel row with the individual focus detection light fluxes passing through the range-finding pupil 92 and the range-finding pupil 93 is obtained. Next, image shift detection arithmetic processing (correlational processing, phase difference detection processing) to be detailed later is executed by using the information thus obtained so as to detect the image shift between the pair of images through the pupil division-type detection method. The image shift amount is then multiplied by a predetermined conversion coefficient and, as a result, the extent of deviation (defocus amount) of the current image forming plane (the image forming plane on which the image is formed at the focus detection position corresponding to a specific micro-lens array position on the estimated image forming plane) relative to the estimated image forming plane can be calculated. It is to be noted that the accuracy with which the defocus amount (image shift amount) is detected is determined in correspondence to the image detection pitch set for the image shift amount detection and the opening angle formed with the gravitational centers of the range-finding pupils.

It is to be noted that FIG. 15 schematically shows the first focus detection pixel (the micro-lens 50 and the pair of photoelectric conversion units 52 and 53) disposed on the optical axis 91 and the adjacent first focus detection pixel (the micro-lens 60 and the pair of photoelectric conversion units 62 and 63). At each of the other focus detection pixels, too, the light fluxes arriving at the micro-lens from the pair of range-finding pupils are received at the pair of photoelectric conversion units.

Figure 16:
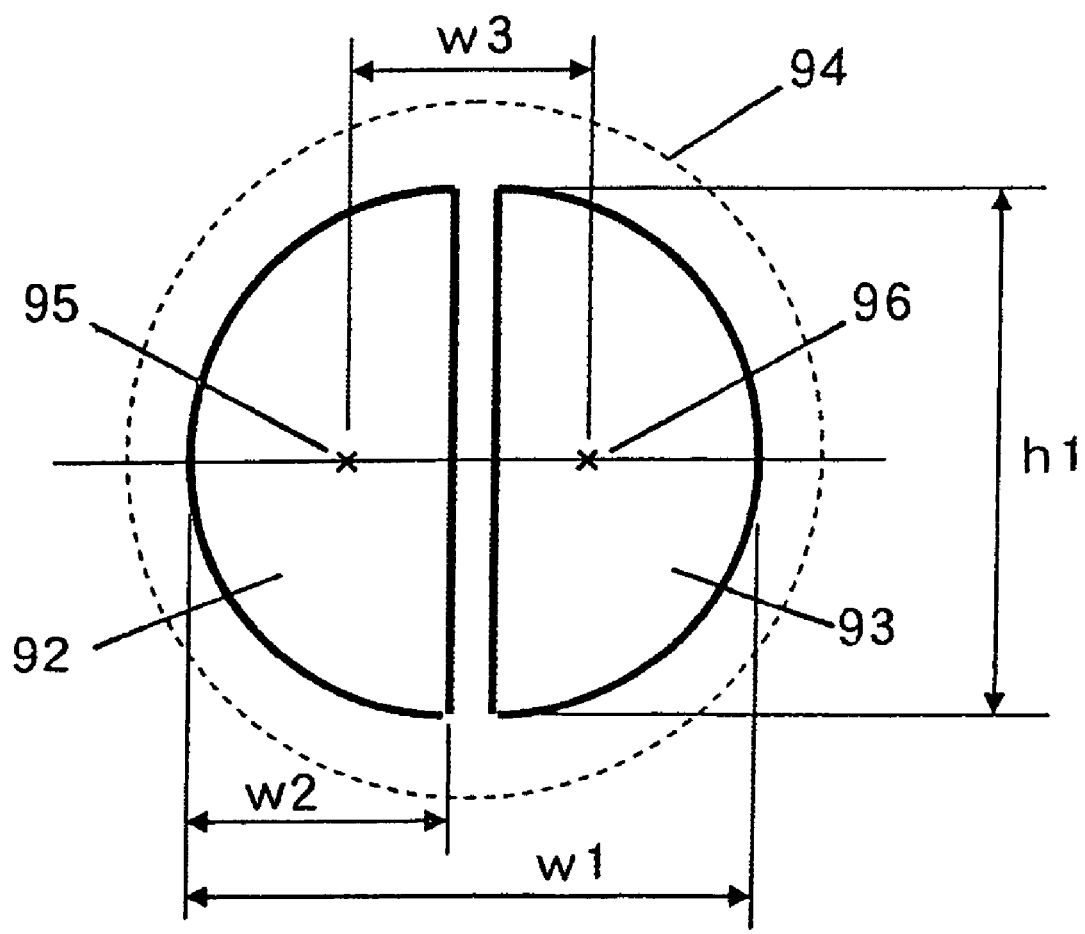
FIG. 16 is a front view, showing the relationship between the projection areas (range-finding pupils) of the pair of photoelectric conversion units in a first focus detection pixel over the exit pupil plane of the exchangeable lens.

FIG. 16 is a front view showing the relationship between the projection ranges (range-finding pupils) over which the pair of photoelectric conversion units 12 and 13 in a first focus detection pixel 311 are projected on the exit pupil 90 of the exchangeable lens unit 202. A circle circumscribing the range-finding pupils 92 and 93 (indicated by the solid lines) formed by projecting the pair of photoelectric conversion units 12 and 13 (see FIG. 9) in the first focus adjustment pixel 311 onto the exit pupil plane 90 via the micro-lens 10, as viewed from the estimated image forming plane, assumes a specific opening F value (range-finding pupil F value).

A circle 94 indicated by the dotted line in FIG. 16 is the outer edge of the exit pupil 90 of the exchangeable lens unit 202. In addition, points 95 and 96 indicate the positions of the gravitational centers of the range-finding pupils 92 and 93 along the direction in which the range-finding pupils 92 and 93 are set side-by-side. In correspondence to the opening angle formed by viewing the two gravitational center positions 95 and 96 (the distance w3) from the focus detection position, the value of the conversion coefficient used to convert the image shift amount to the defocus amount is determined. The focus detection accuracy improves as the opening angle increases, whereas the defocus amount detection range increases as the opening angle becomes smaller (the image shift amount corresponding to a given defocus amount is smaller).

In the example presented in FIG. 16, the pair of range-finding pupils 92 and 93 are semicircles set so as to achieve a lateral symmetry. The width w1 over which the pair of range-finding pupils 92 and 93 range along the direction in which they are set side-by-side is substantially equal to the height h1 of the range-finding pupils 92 and 93 measured along the direction perpendicular to the direction in which the range-finding pupils are set side-by-side. In addition, w2 indicates the width of each range-finding pupil 92 and 93 measured along the direction in which the range-finding pupils 92 and 93 are set side-by-side. When the width w2 is large, defocusing results in a significant extent of image blur.

Figure 17:
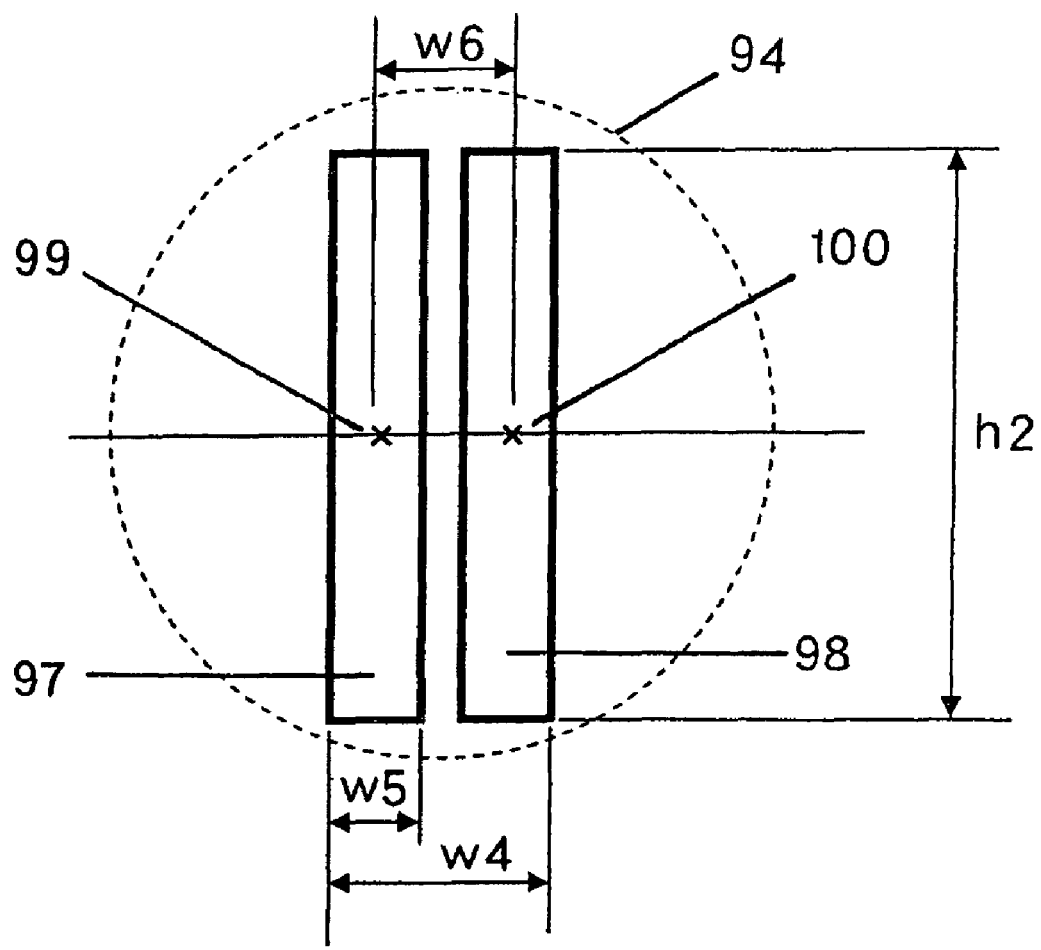
FIG. 17 is a front view, showing the relationship between the projection areas (range-finding pupils) of the pair of photoelectric conversion units in a second focus detection pixel over the exit pupil plane of the exchangeable lens.

FIG. 17 is a front view showing the relationship between the projection ranges (range-finding pupils) over which the pair of photoelectric conversion units 14 and 15 in a second focus detection pixel 312 are projected on the exit pupil 90 of the exchangeable lens unit 202. By projecting the pair of photoelectric conversion units 14 and 15 (see FIG. 10) in the second focus adjustment pixel 312 onto the exit pupil plane 90 via the micro-lens 10, range-finding pupils 97 and 98 (indicated by the solid lines) of the second focus detection pixel 312 are formed.

The circle 94 indicated by the dotted line in FIG. 17 is the outer edge of the exit pupil 90 of the exchangeable lens unit 202. In addition, points 99 and 100 indicate the positions of the gravitational centers of the range-finding pupils 97 and 98 along the direction in which the range-finding pupils are set side-by-side. The opening angle formed by viewing the gravitational center positions 99 and 100 (the distance w6) from the focus detection position is smaller than the opening angle formed in correspondence to the first focus detection pixel 311, and the conversion coefficient, determined in correspondence to this opening angle to be used to convert the image shift amount to the defocus amount, too, assumes a smaller value. Namely, the second focus detection pixels 312 are optimized for large defocusing detection.

Figure 18:
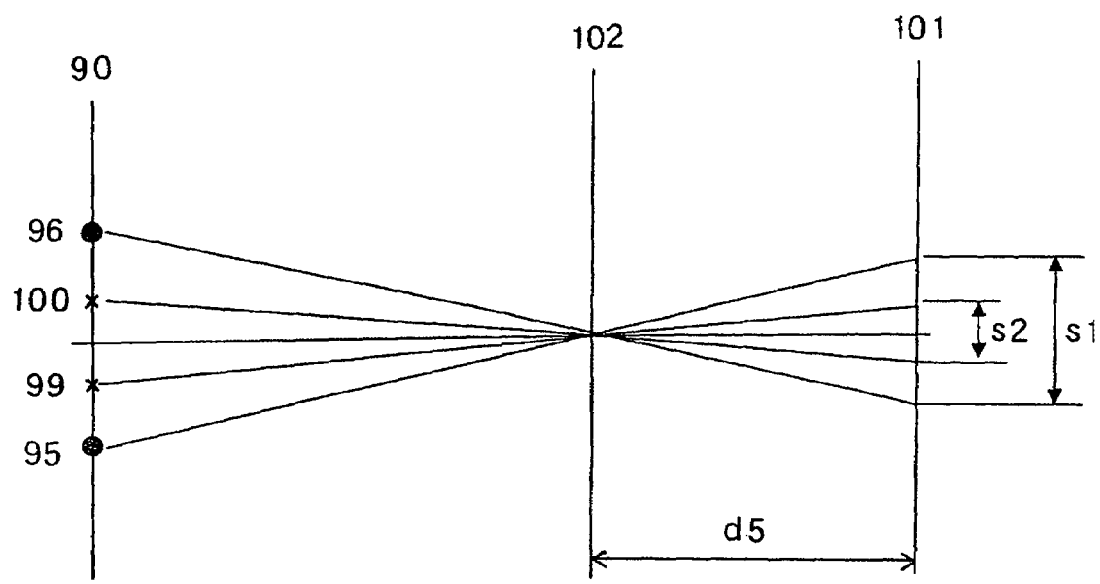
FIG. 18 shows the relationship among the defocus amount, the image shift amount at the image sensor surface and the positions of the gravitational centers of the range-finding pupils on the exit pupil.

For instance, in the example presented in FIG. 18 with reference numeral 101 indicating the image sensor surface, reference numeral 102 indicating the image forming plane and d5 indicating the defocus amount at the image sensor surface 101, the image shift S1 at the image sensor surface 101 is determined in correspondence to the angle formed by viewing the gravitational center positions 95 and 96 on the exit pupil 90 through focus detection executed via the pixel row of the first focus detection pixels 311. In addition the image shift S2 (S2<S1) at the image sensor surface 101 is determined in correspondence to the angle formed by viewing the gravitational center positions 99 and 100 on the exit pupil 90 through focus detection executed via the pixel row of the second focus detection pixels 312. As long as the image shift amount is small, the focus detection pixel row does not need to be long.

In addition, the pair of range-finding pupils 97 and 98 in FIG. 17 are rectangles set so as to achieve line symmetry. The width w4 over which the range-finding pupils 97 and 98 range along the direction in which they are set side-by-side is smaller than the width w1 (see FIG. 16) over which the range-finding pupils 92 and 93 in correspondence to the first focus detection pixel 311, range along the direction in which they are set side-by-side. The height h2 of the range-finding pupils 97 and 98 measured along the direction perpendicular to the direction in which the range-finding pupils 97 and 98 are set side-by-side is equal to or greater than the height h1 (see FIG. 16) of the range-finding pupils 92 and 93 measured along the direction perpendicular to the direction along which they are set side-by-side in correspondence to the first focus detection pixel 311. The width w5 of either the range-finding pupil 97 or 98 (range-finding pupil 97 in this example) measured along the direction in which the range-finding pupils 97 and 98 are set side-by-side is set smaller than the width w2 (see FIG. 16) of either the range-finding pupil 92 or 93 (range-finding pupil 92 in this case) measured along the direction in which the range-finding pupils 92 and 93 are set side-by-side in correspondence to the first focus detection pixel 311. Thus, even a large extent of defocusing does not lead to a significant image blur and highly accurate image shift detection can be executed by using a high contrast image.

Figure 19A:
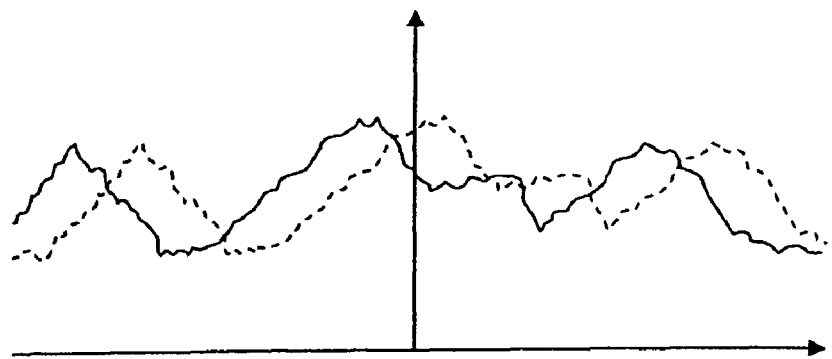
FIGS. 19A-19c show the distribution of the image intensity detected by varying the width of one of the range-finding pupils measured along the direction in which the pupils are set side-by-side from a small setting to an intermediate setting and a large setting relative to a large defocus amount that remains constant (relative to a constant image shift amount)
Figure 19B:
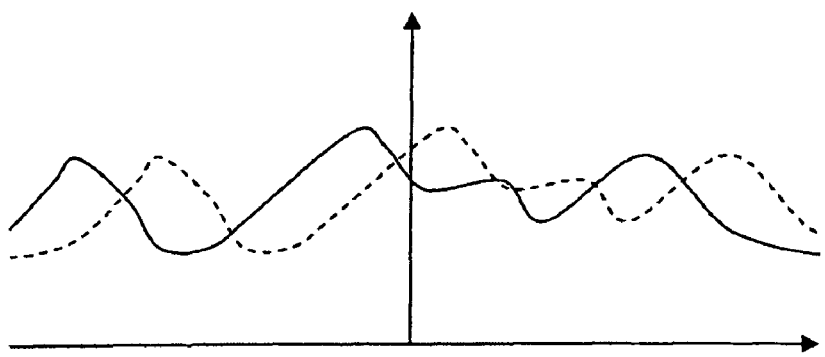
Figure 19C:
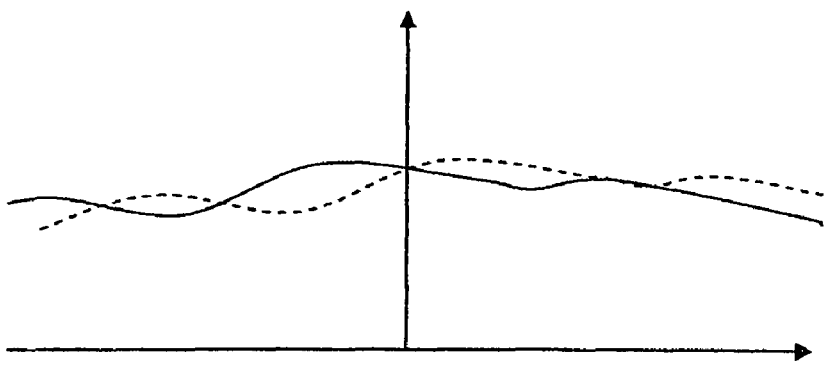

FIGS. 19A, 19B and 19C show the distributions of the image intensity detected by varying the width of one of the range-finding pupils measured along the direction in which the range-finding pupils are set side-by-side from a small setting to an intermediate setting and a large setting relative to a given large defocusing amount (relative to a given image shift amount). The direction in which the range-finding pupils are set side-by-side is the direction in which the range-finding pupils 92 and 93 are set side-by-side in FIG. 16. In this case, the width of one of the range-finding pupils is W2. In addition, the width of one of the range-finding pupils, taken along the direction in which the range-finding pupils 97 and 98 are set side-by-side in FIG. 17, is W5. If the width of the range-finding pupil measured along the direction in which the two range-finding pupils are set side-by-side is large, a fine image structure becomes blurred, resulting in an image containing a low frequency component alone, and in such a case, accurate image shift detection cannot be executed with ease or the image shift detection itself may become disabled. If, on the other hand, the width of one of the range-finding pupils, measured along the direction in which the range-finding pupils are set side-by-side, is small, the fine image structure will be retained even if there is defocusing, enabling accurate image shift detection.

By setting the height h2 of the range-finding pupils 97 and 98 measured along the direction perpendicular to the direction in which the range-finding pupils 97 and 98 are set side-by-side, to a value greater than the width w4 over which the range-finding pupils 97 and 98 range along the direction in which they are set side-by-side, a sufficient quantity of light can be obtained for large defocusing detection and a desired level of focus detection performance can be maintained even at low brightness levels.

Figure 20:
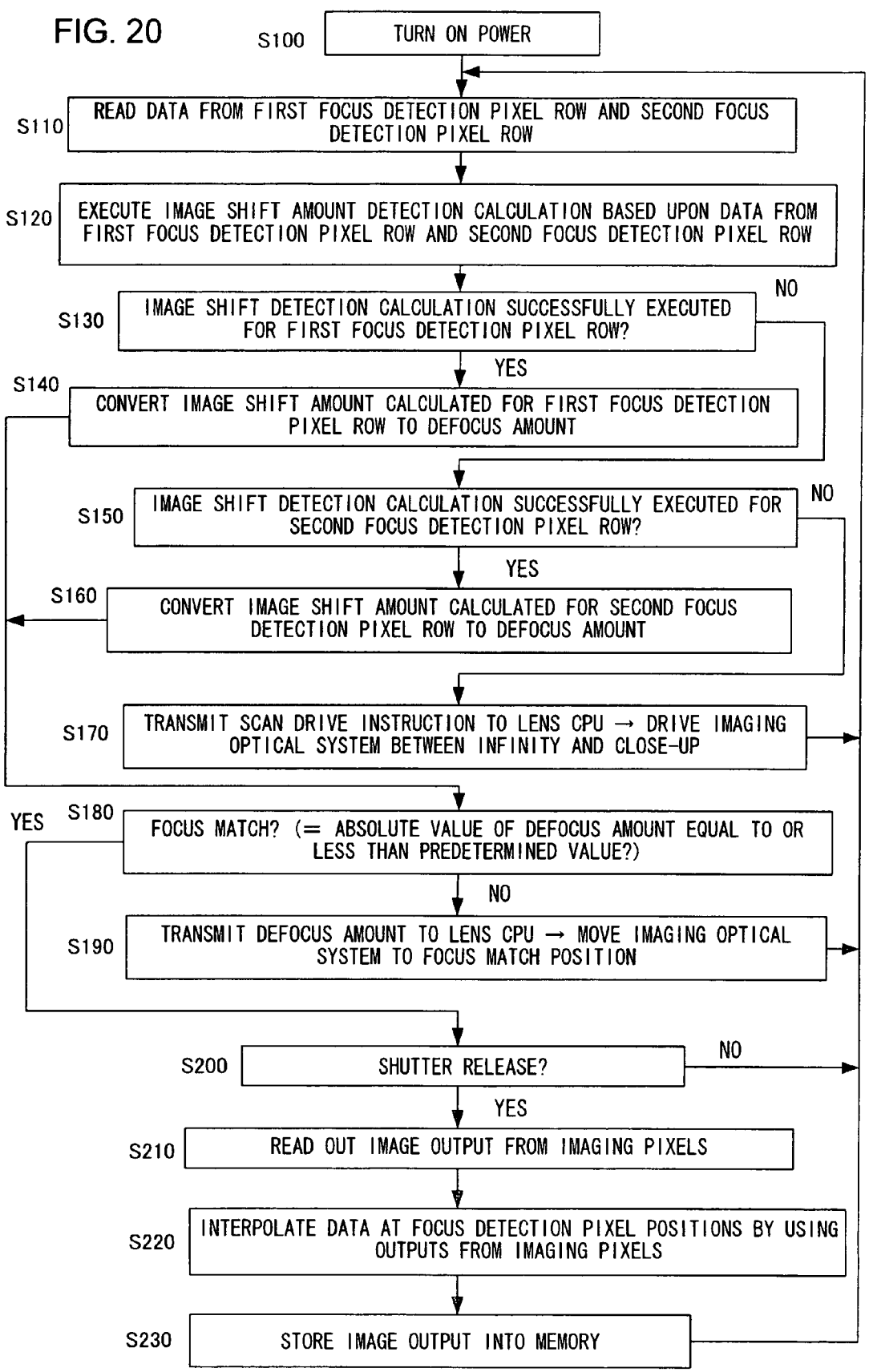
FIG. 20 presents a flowchart of the operations executed in the digital still camera (imaging device) shown in FIG. 1.

FIG. 20 presents a flowchart of the operations executed in the digital still camera (imaging device) shown in FIG. 1. The camera drive control device 212 repeatedly executes the processing in step S110 and subsequent steps after power is turned on at the camera body 203 in step S100. In step S110, data are read out from the pixel row of the first focus detection pixels 311 and the pixel row of second focus detection pixels 312. It is assumed that the photographer has selected in advance a specific focus detection area by operating an operation member via which focus detection area is selected. In step S120, image shift detection calculation processing is executed based upon pairs of sets of image data, one pair corresponding to the pixel row of the first focus detection pixels 311 and the other pair corresponding to the pixel row of the second focus detection pixels 312, to calculate the image shift amount.

The image shift detection calculation processing (correlational algorithm) is now explained in reference to FIG. 22. A correlation quantity C(L) is first calculated by using the differential correlational algorithm expressed in (1) below, with ei and fi (i=1 to m) representing the pair of sets of data corresponding to each focus detection pixel row.

$$C(L)=\Sigma|e(i+L)-f(i)| \quad (1)$$

L in expression (1) is an integer representing the relative shift amount indicated in units corresponding to the pitch at which the pair of sets of data are detected. In addition, L assumes a value within a range Lmin to Lmax (−5 to +5 in the figure). Σ indicates total sum calculation over a range expressed as i=p to q, with p and q satisfying a conditional expression 1≦p<q≦m. The specific values assumed for p and q define the size of the focus detection area.

Figure 22A:
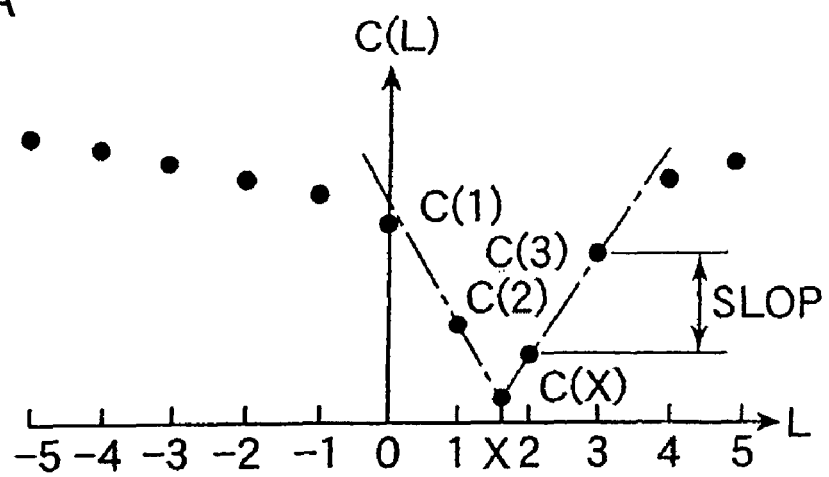
FIGS. 22A-22C illustrate the concept of the image shift detection calculation processing (correlational algorithm)

As shown in FIG. 22A, the results of the calculation executed as expressed in (1) indicate the smallest correlation quantity C(L) in correspondence to the shift amount L=kj (kj=2 in FIG. 22A) indicating a high level of correlation between the pair of sets of data. Next, a shift amount x, which will provide the minimum value C(L)min=C(x) in a continuous curve representing the correlation quantities, is determined through the three-point interpolation method as expressed in (2) to (5) below.

$$x=kj+D/SLOP \quad (2)$$

$$C(x)=C(kj)-|D| \quad (3)$$

$$D=\{C(kj-1)-C(kj+1)\}/2 \quad (4)$$

$$SLOP=MAX\{C(kj+1)-C(kj), C(kj-1)-C(kj)\} \quad (5)$$

In addition, a defocus amount DEF representing the extent of defocusing of the subject image plane relative to the estimated image forming plane can be determined as expressed in (6) below based upon the shift amount x having been calculated as expressed in (2).

$$DEF=KX \cdot PY \cdot x \quad (6)$$

PY in expression (6) represents the detection pitch, whereas KX in expression (6) represents the conversion coefficient that is determined in correspondence to the opening angle formed with the gravitational centers of the pair of range-finding pupils.

Figure 22B:
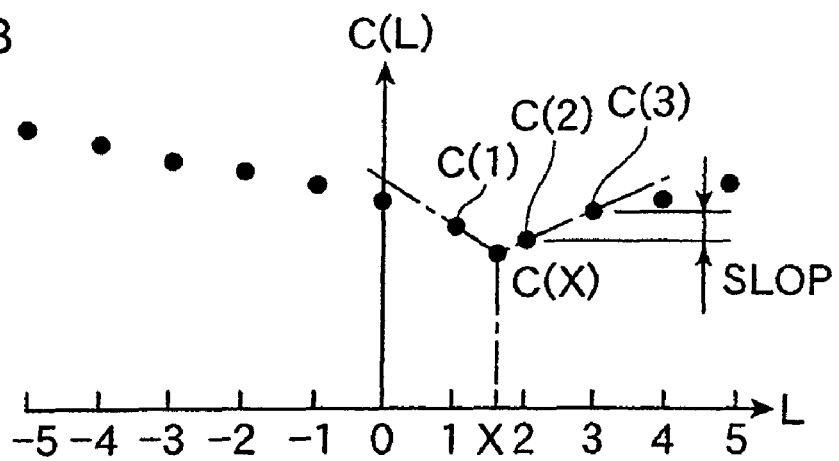

The judgment as to whether or not the calculated defocus amount DEF is reliable is made as follows. As shown in FIG. 22B, the interpolated minimum value C(X) of the correlation quantity increases when the level of correlation between the pair of sets of data is low. Accordingly, if C(X) is equal to or greater than a predetermined value, the defocus amount is judged to be less reliable. Alternatively, C(X) may be standardized with regard to the data contrast, and in such a case, if the value obtained by dividing C(X) by SLOP indicating a value in proportion to the contrast is equal to or greater than a predetermined value, the defocus amount should be judged to be not reliable. As a further alternative, if SLOP indicating the value in proportion to the contrast is equal to or less than a predetermined value, the subject should be judged to be a low contrast subject and, accordingly, the reliability of the calculated defocus amount DEF should be judged to be low.

Figure 22C:
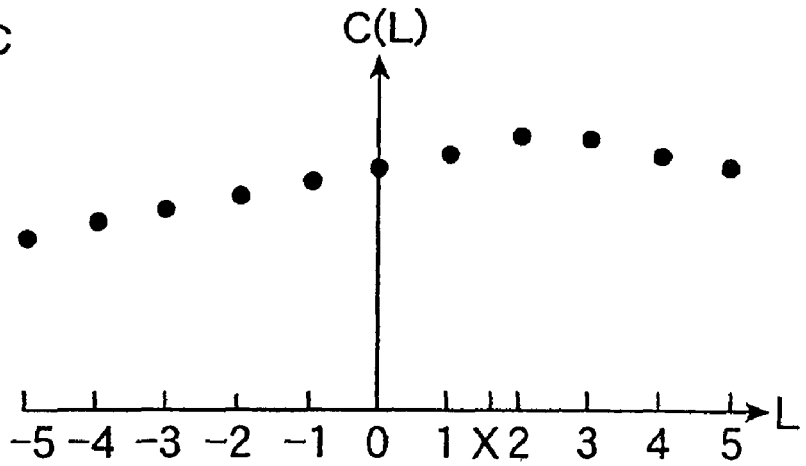

It is to be noted that if the level of correlation between the pair of sets of data is low and the correlation quantity C(L) does not dip at all over the shift range Lmin to Lmax, as shown in FIG. 22C, the minimum value C(X) cannot be determined. Under such circumstances, it is judged that the focus detection is disabled.

Figure 21:
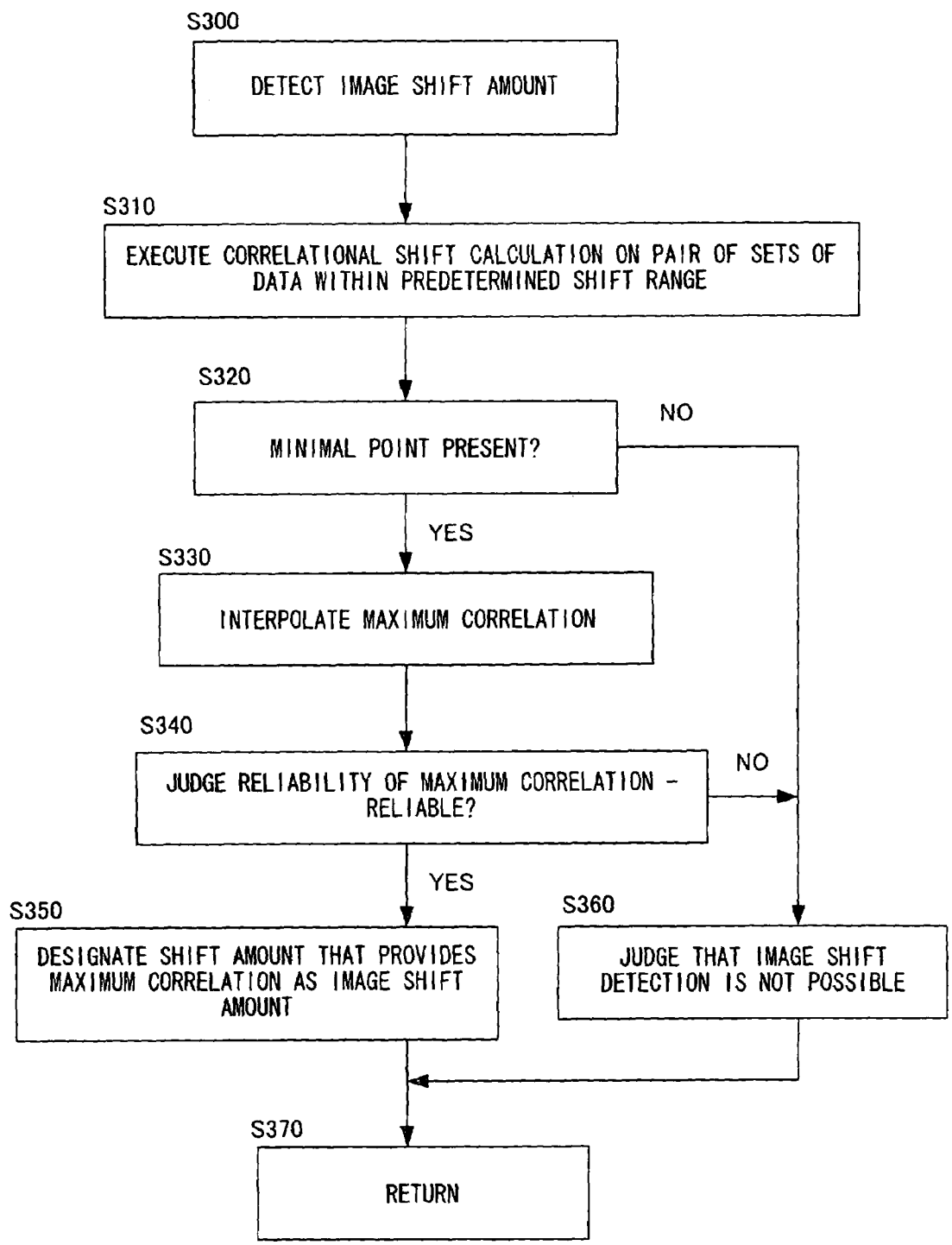
FIG. 21 presents a flowchart of the image shift detection calculation processing (correlational algorithm)

FIG. 21 presents a flowchart of the image shift amount detection operation executed in step S120 in FIG. 20. After starting the image shift amount detection operation in step S300, correlational shift calculation is executed on the pair of sets of data over a predetermined shift range in step S310. In step S320, a decision is made as to whether or not there is a minimal point with which three-point interpolation calculation can be executed. If it is decided that there is no such minimal point, the operation proceeds to step S360. In step S360, it is judged that image shift detection is not possible (disabled focus detection), before the operation makes a return from step S370.

If, on the other hand, it is decided in step S320 that there is an eligible minimal point, the operation proceeds to step S330 to interpolate the maximum correlational quantity at a point close to the correlation quantity indicating the highest extent of correlation. In step S340 following step S330, the reliability of the maximum correlation quantity is judged. If it is decided that the maximum correlation quantity is not reliable, image shift detection is judged to be not possible (disabled focus detection) in step S360 before the operation makes a return from step S370. If, on the other hand, it is decided that the maximum correlation quantity is reliable, the operation proceeds to step S350 to designate the shift amount corresponding to the maximum correlation quantity as the image shift amount and then the operation makes a return from step S370.

In step S130 in FIG. 20, to which the operation makes a return, a decision is made as to whether or not the image shift detection calculation has been executed with success by using the first focus detection pixel row data, i.e., whether or not the focus can be detected by using the first focus detection pixel row data. If it is decided that the focus detection is possible, the operation proceeds to step S140 to convert the image shift amount indicated in the results of the calculation executed by using the first focus detection pixel row data to the defocus amount, and then the operation proceeds to step S180.

If, on the other hand, it is decided in step S130 that the focus detection is not possible, the operation proceeds to step S150. In step S150, a decision is made as to whether or not the image shift detection calculation has been successfully executed by using the second focus detection pixel row data, i.e., whether or not the focus can be detected by using the second focus detection pixel row data. If it is decided that the focus detection is possible, the operation proceeds to step S160 to convert the image shift amount indicated in the results of the calculation executed by using the second focus detection pixel row data to the defocus amount and then the operation proceeds to step S180.

If it is decided in step S150 that the focus detection is not possible, the operation proceeds to step S170. In step S170, an instruction (scan drive instruction) for the CPU (not shown) in the lens drive control device 209 to drive the focusing lens toward the infinity side or the close-up side by a specific extent is transmitted, and the operation then returns to step S110. Upon receiving the scan drive instruction, the lens drive control device 209 drives the focusing lens 207 by the specific extent toward the infinity side or the close-up side.

In step S180, a decision is made as to whether or not the absolute value of the calculated defocus amount is equal to or less than a predetermined value, i.e., whether or not the focusing lens 207 is set at a point near the focus match position. If the absolute value of the defocus amount is not equal to or less than the predetermined value, the operation proceeds to step S190. In step S190, the defocus amount is transmitted to the CPU in the lens drive control device 209 so as to enable the lens drive control circuit to drive the focusing lens 207 in the exchangeable lens unit 202 to the focus match position. Once the processing in step S190 ends, the operation returns to step S110 to repeatedly execute the operations described above.

If it is decided in step S180 that the absolute value of the defocus amount is equal to or less than the predetermined value, the operation proceeds to step S200. In step S200, a decision is made as to whether or not a shutter release has been executed through an operation at a shutter release button (not shown). If it is decided that a shutter release has not been executed, the operation returns to step S110 to repeatedly execute the operations described above. If, on the other hand, it is decided that a shutter release has been executed, the operation proceeds to step S210 to read out the image signals from the imaging pixels at the image sensor 211.

In step S220 following step S210, a pixel signal at each of the pixels of the first focus detection pixel row and the second focus detection pixel row is obtained through interpolation by using the signals from the surrounding imaging pixels. In step S230 following step S220, the image signals are saved into the memory card 213. Subsequently, the operation returns to step S110 to repeatedly execute the operations described above.

A pixel signal at each of the pixels of the first focus detection pixel row is interpolated as explained below based upon the signals from the surrounding imaging pixels. FIG. 23 shows the positional arrangement with regard to the first focus detection pixel row (AF1-AF5) and the surrounding imaging pixels (blue pixels B1-B6, red pixels R1-R4 and green pixels G1-G10). With J (AF2) indicating the output of the focus detection pixel AF2 set at a position that would otherwise be taken up by a green pixel and I(G3), I(G4), I (G6) and I (G7) indicating the outputs from the surrounding green pixels, a pixel output I(AF2) at the position assumed by the focus detection pixel AF2 is expressed as in (7) below.

$$I(AF2)=(I(G3)+I(G4)+I(G6)+I(G7))/4 \quad (7)$$

Alternatively, I(AF2) may be calculated as in expression (8) below by taking into consideration the output J (AF2) from the focus detection pixel AF2.

$$I(AF2)=(I(G3)+I(G4)+I(G6)+I(G7)+k1 \times J(AF2))/5 \quad (8)$$

k1 in expression (8) represents a coefficient used for sensitivity adjustment.

With J (AF3) indicating the output of the focus detection pixel AF3 set at a position that would otherwise be taken up by a blue pixel and I(B2) and I(B5) indicating the outputs from the surrounding blue pixels, the pixel output I (AF3) at the position assumed by the focus detection pixel AF3 is expressed as in (9) below.

$$I(AF3)=(I(B2)+I(B5))/2 \quad (9)$$

Alternatively, I(AF3) may be calculated as in expression (10) below by taking into consideration the output J (AF3) of the focus detection pixel AF3.

$$I(AF3)=(I(B2)+I(B5)+k2 \times J(AF3))/3 \quad (10)$$

k2 in expression (10) represents a coefficient used for sensitivity adjustment.

A pixel signal at each of the pixels in the second focus detection pixel row, too, is obtained through interpolation based upon the pixel signals output from the surrounding imaging pixels. However, the quality of the pixel signal obtained through interpolation at a position that would otherwise be taken up by a blue pixel is improved over the quality of the pixel signal expressed in (9) or (10), since it can be interpolated by using the outputs from the blue pixels present along the direction in which the focus detection pixels are arrayed, as well.

(Variations of Image Sensors)

At the image sensor 211 shown in FIG. 7, the first focus detection pixels 311 for high-accuracy focus detection are disposed densely without allowing any intervals and the second focus detection pixels 312 for large defocusing detection are disposed with two-pixel intervals. At an image sensor 211A shown in FIG. 24, the first focus detection pixels 311 for high-accuracy focus detection are set with a one-pixel interval and the second focus detection pixels 312 for large defocusing detection are each disposed at every fourth pixel position.

Figure 24:
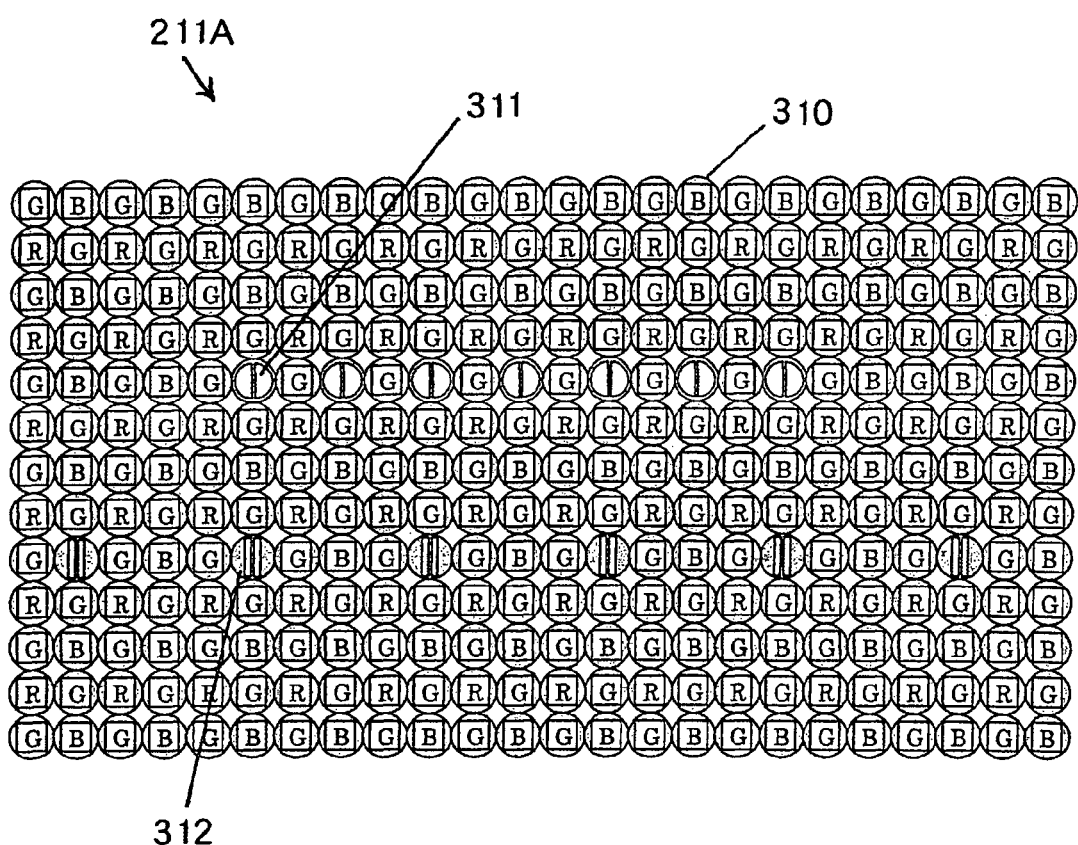
FIG. 24 shows the image sensor in a variation.

The quality of an image obtained by the image sensor 211A in the variation shown in FIG. 24 is improved, since the first focus detection pixels 311 for high-accuracy focus detection at the image sensor 211A are disposed with one-pixel intervals and thus the interpolation error becomes less noticeable compared to that at the image sensor 211 shown in FIG. 7. It is to be noted that the first focus detection pixels 311 for high-accuracy focus detection are set at positions that would otherwise be taken up by imaging pixels equipped with B filters at the image sensor 211A in FIG. 24. However, a similar advantage will be achieved by disposing the first focus detection pixels at positions that would otherwise be taken up by pixels equipped with G filters.

In addition, while the focus detection pixels 311 and 312 shown in FIGS. 9 and 10 each include a pair of photoelectric conversion units (12, 13) or (14, 15), focus detection may also be executed by using focus detection pixels each equipped with a single photoelectric conversion unit instead of a pair of photoelectric conversion units. For instance, instead of the first focus detection pixels 311 for high-accuracy focus detection shown in FIG. 9, first focus detection pixels 313 and 314 for high-accuracy focus detection shown in FIGS. 25A and 25B may be alternately arrayed to enable focus detection. The focus detection pixel 313 in FIG. 25A includes a single photoelectric conversion unit 16 which corresponds to the photoelectric conversion unit 13 in FIG. 9. The focus detection pixel 314 in FIG. 25B includes a single photoelectric conversion unit 17 which corresponds to the photoelectric conversion unit 12 in FIG. 9.

Figure 26A:
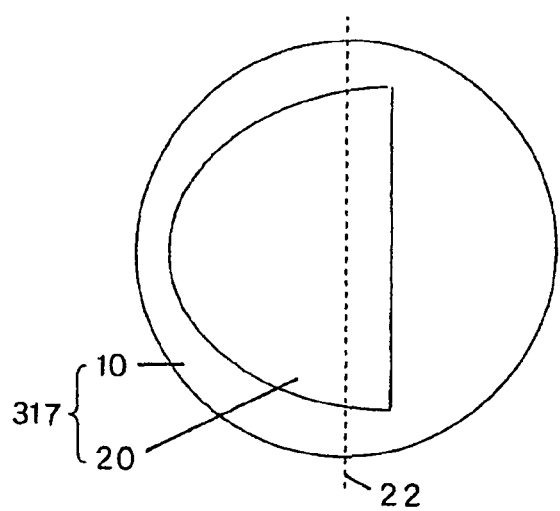
FIGS. 26A and 26B show first focus detection pixels in another variation.
Figure 26B:
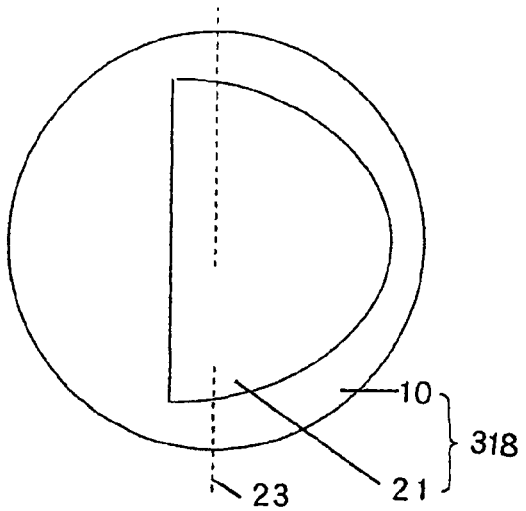

The pair of range-finding pupils formed by projecting the photoelectric conversion units 16 and 17 in FIGS. 25A and 25B via the micro lenses 10 do not overlap each other, as shown in FIG. 16. However, the photoelectric conversion units may instead assume shapes such as those shown in FIGS. 26A and 26B so as to allow the pair of range-finding pupils, formed by projecting them onto the exit pupil via the micro lenses 10, to partially overlap each other. With such photoelectric conversion units, a sufficient quantity of light can be obtained more easily and thus, the focus detection performance at low brightness levels can be improved. The focus detection pixel 317 in FIG. 26A includes a single photoelectric conversion unit 20 ranging beyond the central line 22 of the pixel, whereas the focus detection pixel 318 in FIG. 26B includes a single photoelectric conversion unit 21 ranging beyond the central line 23 of the pixel.

In addition, instead of the second focus detection pixels 312 for large defocusing detection shown in FIG. 10, second focus detection pixels 313 and 314 for large defocusing detection shown in FIGS. 27A and 27B may be alternately arrayed to enable focus detection. The focus detection pixel 315 in FIG. 27A includes a single photoelectric conversion unit 18 which corresponds to the photoelectric conversion unit 15 in FIG. 10. The focus detection pixel 316 in FIG. 27B includes a single photoelectric conversion unit 19, which corresponds to the photoelectric conversion unit 14 in FIG. 10.

Figure 28:
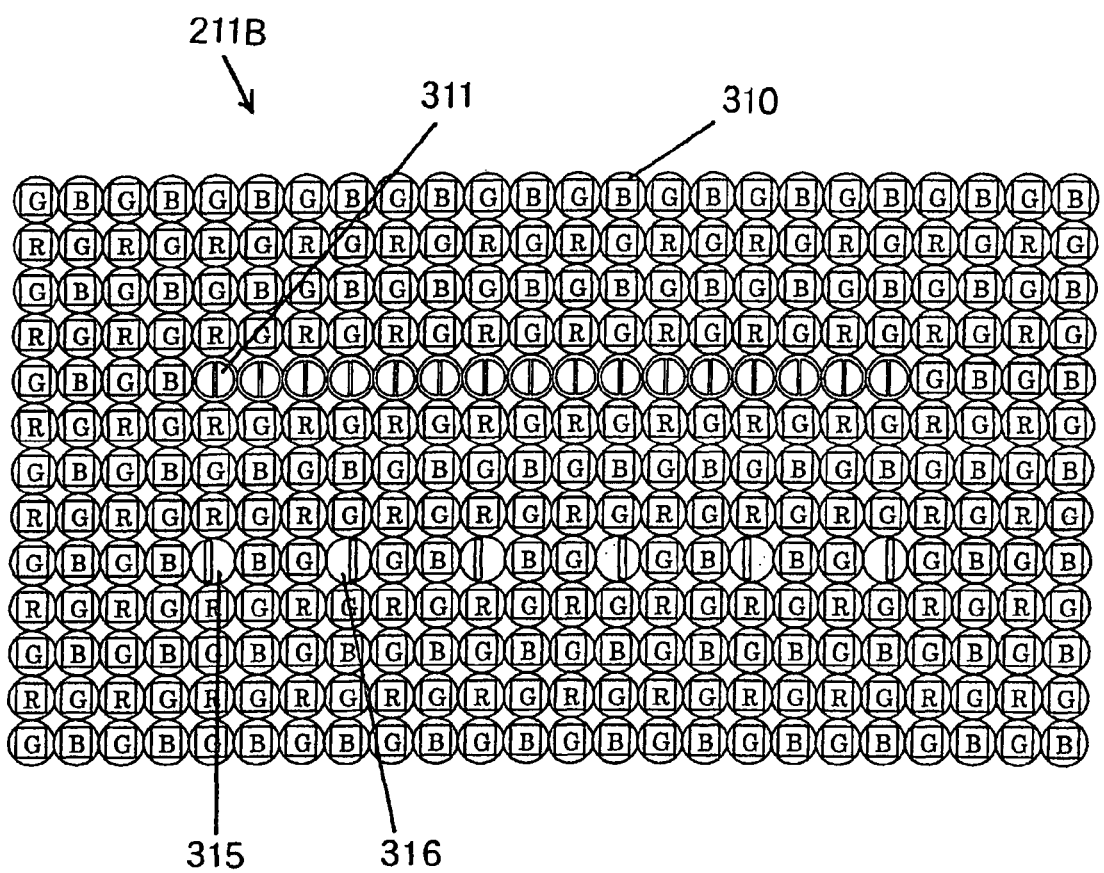
FIG. 28 shows the image sensor in yet another variation.
Figure 29:
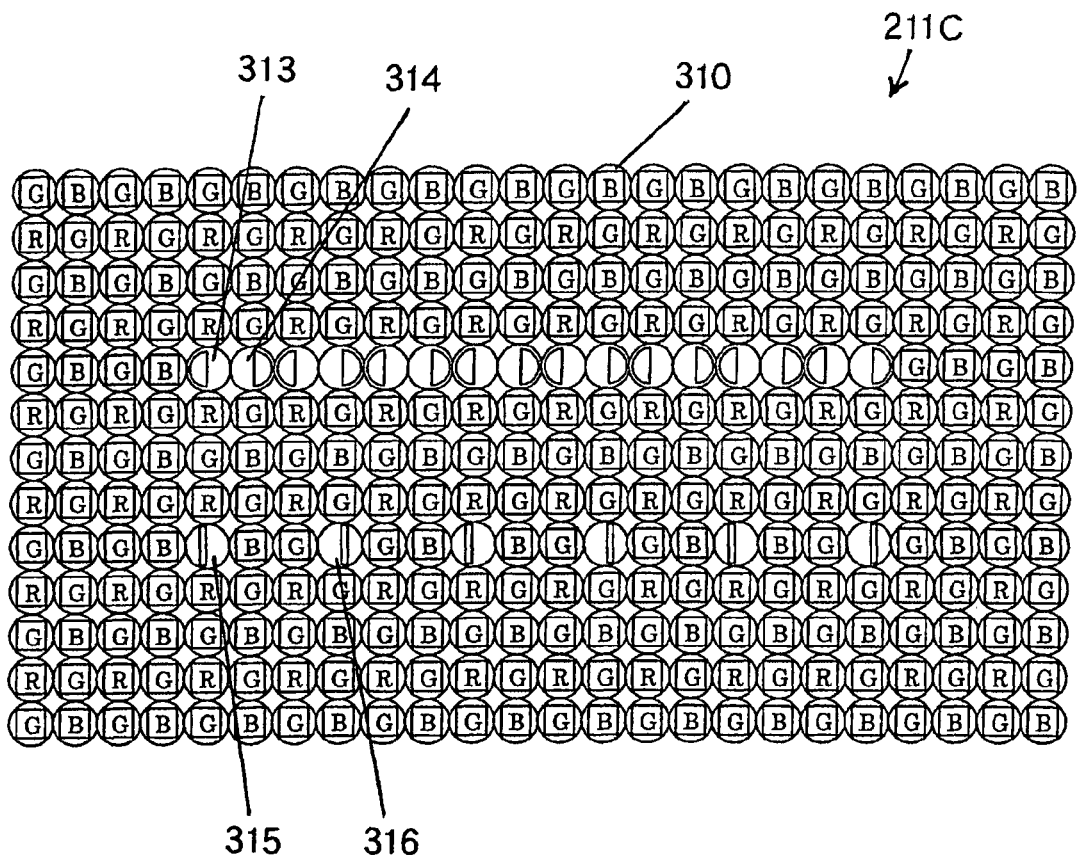
FIG. 29 shows the image sensor in yet another variation.

FIG. 28 shows an image sensor 211B that includes second focus detection pixels constituted with the focus detection pixels 315 and 316 shown in FIGS. 27A and 27B. FIG. 29 shows an image sensor 211C that includes first focus detection pixels constituted with the focus detection pixels 313 and 314 shown in FIGS. 25A and 25B and second focus detection pixels constituted with the focus detection pixels 315 and 316 shown in FIGS. 27A and 27B. It is to be noted that the image is detected via the focus detection pixels 313 and 314 with a detection pitch corresponding to a two-pixel unit and the image is detected via the focus detection pixels 315 and 316 with a detection pitch corresponding to a six-pixel unit at the image sensor shown in FIG. 29.

The image sensor 211C in FIG. 29 assumes a simpler structure than the image sensor 211 in FIG. 7 with a pair of photoelectric conversion units installed at each pixel, and thus, the image sensor 211C can be manufactured with greater ease at lower cost.

Figure 30:
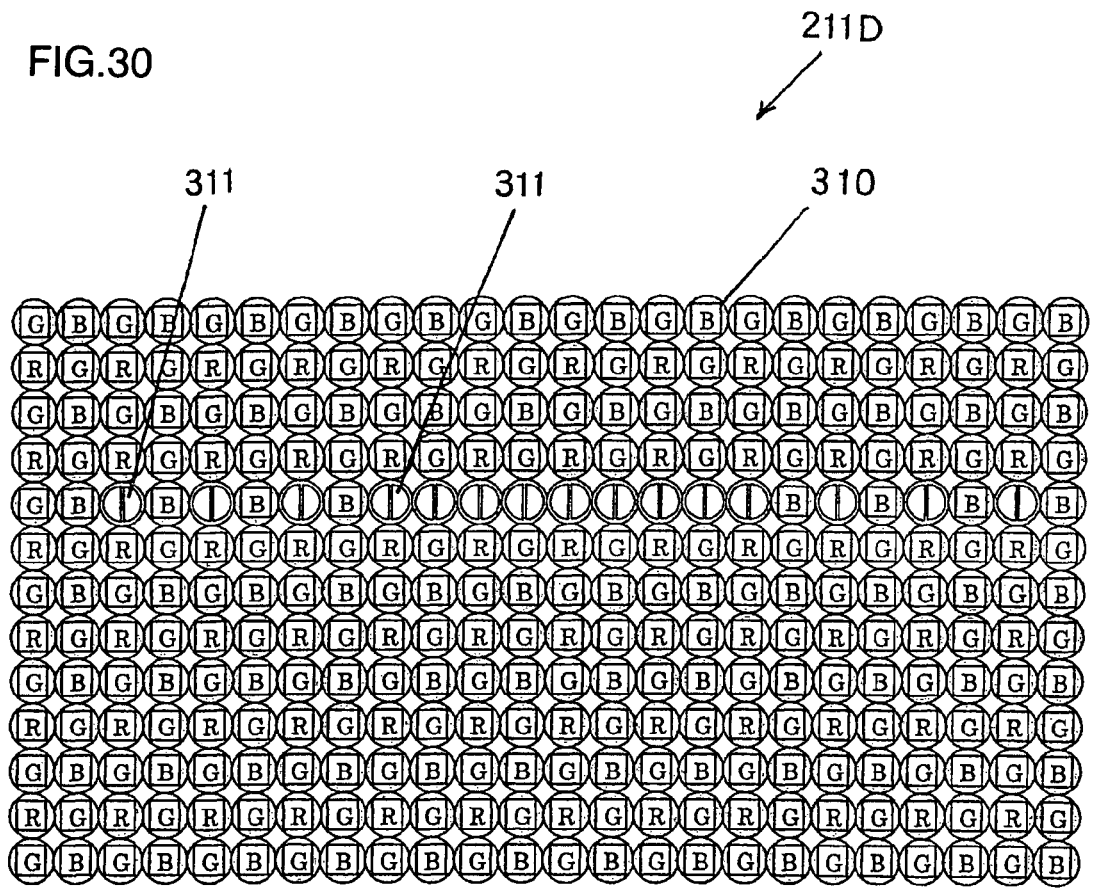
FIG. 30 shows the image sensor in yet another variation.

At the image sensor 211 shown in FIG. 7, two rows of focus detection pixels, i.e., the first focus detection pixel row with a finer image detection pitch and the second focus detection pixel row with a large image detection pitch, are set parallel to each other in each focus detection area. As an alternative, a pixel row with a larger image detection pitch may be attached at an end of the first focus detection pixel row. FIG. 30 shows an image sensor 211D with first focus detection pixels 311 set densely without allowing any intervals at the center of the focus detection area and first focus detection pixels 311 disposed toward the periphery of the focus detection area so as to take up every other pixel position. The output from the pixel row in the center, made up with the densely set first focus detection pixels 311, is used for high-accuracy focus detection, whereas the outputs from every other first focus detection pixel 311 over the central area and the outputs from the peripheral first focus detection pixels 311 are used for large defocusing detection.

The image sensor 211D shown in FIG. 30 with a smaller number of focus detection pixels overall compared to the image sensor 211 shown in FIG. 7, which includes two rows of focus detection pixels in each focus detection area, provides a higher quality image.

Figure 31:
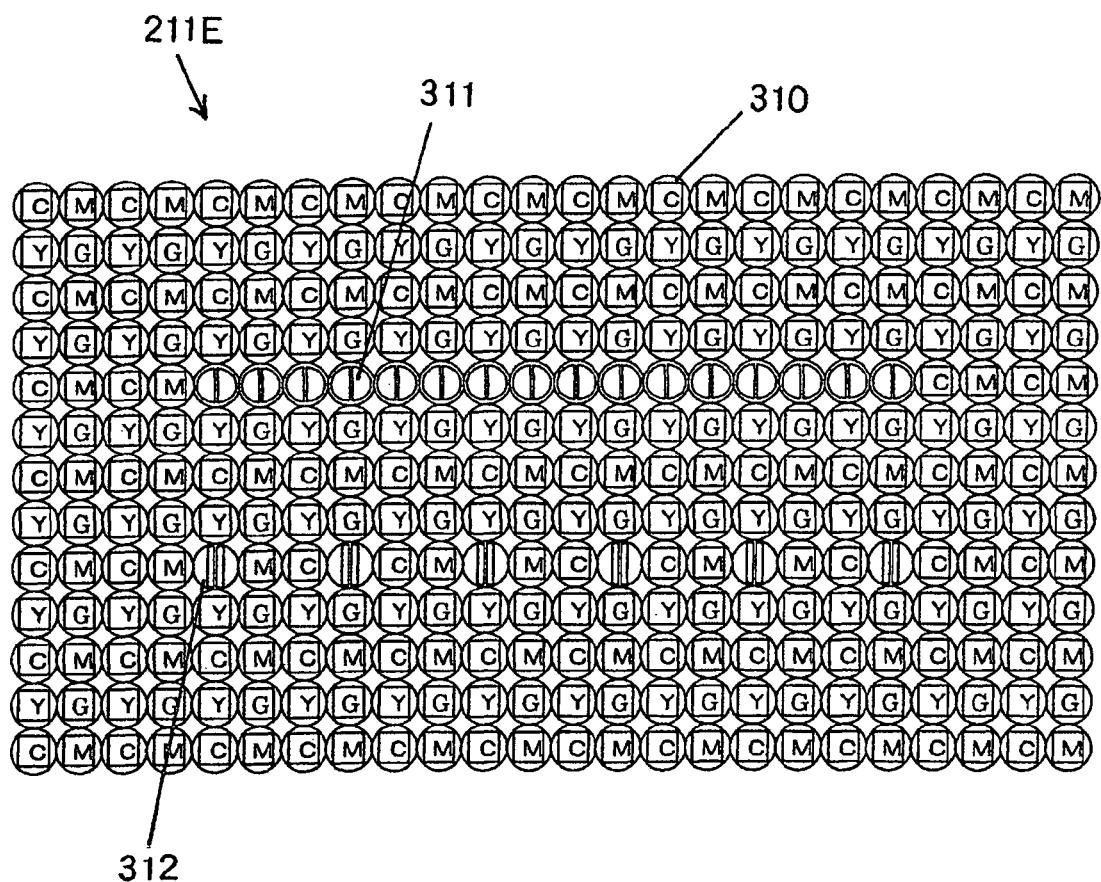
FIG. 31 shows the image sensor in yet another variation.

While the image sensor 211 in FIG. 7 includes imaging pixels equipped with color filters set so as to achieve a Bayer array, the structure of the color filters and the color filter array of the color filters are not limited to those in this example. FIG. 31 shows an image sensor 211E equipped with complementary-color filters (green G, yellow Ye, magenta Mg and cyan Cy), which are two-dimensionally arrayed as shown in FIG. 6. At this image sensor, the first focus detection pixels 311 and the second focus detection pixels 312 are disposed at positions that would otherwise be occupied by pixels with cyan Cy filters and magenta Mg filters (colors that contain a blue component with which the output error is relatively unnoticeable).

While the range-finding pupils formed with the first focus detection pixels used for high-accuracy detection and the range-finding pupils formed with the second focus detection pixels used for large defocusing detection do not match each other in size at the image sensor 211 shown in FIG. 7, range-finding pupils with matching sizes may be formed, instead.

While the pupil division-type method with micro lenses is explained above in reference to the embodiment and its variations, the present invention is not limited to applications adopting the pupil division-type method with micro lenses, and it may be equally effectively adopted in a pupil division-type method with polarization filters. The following is an explanation of such an application.

Figure 32:
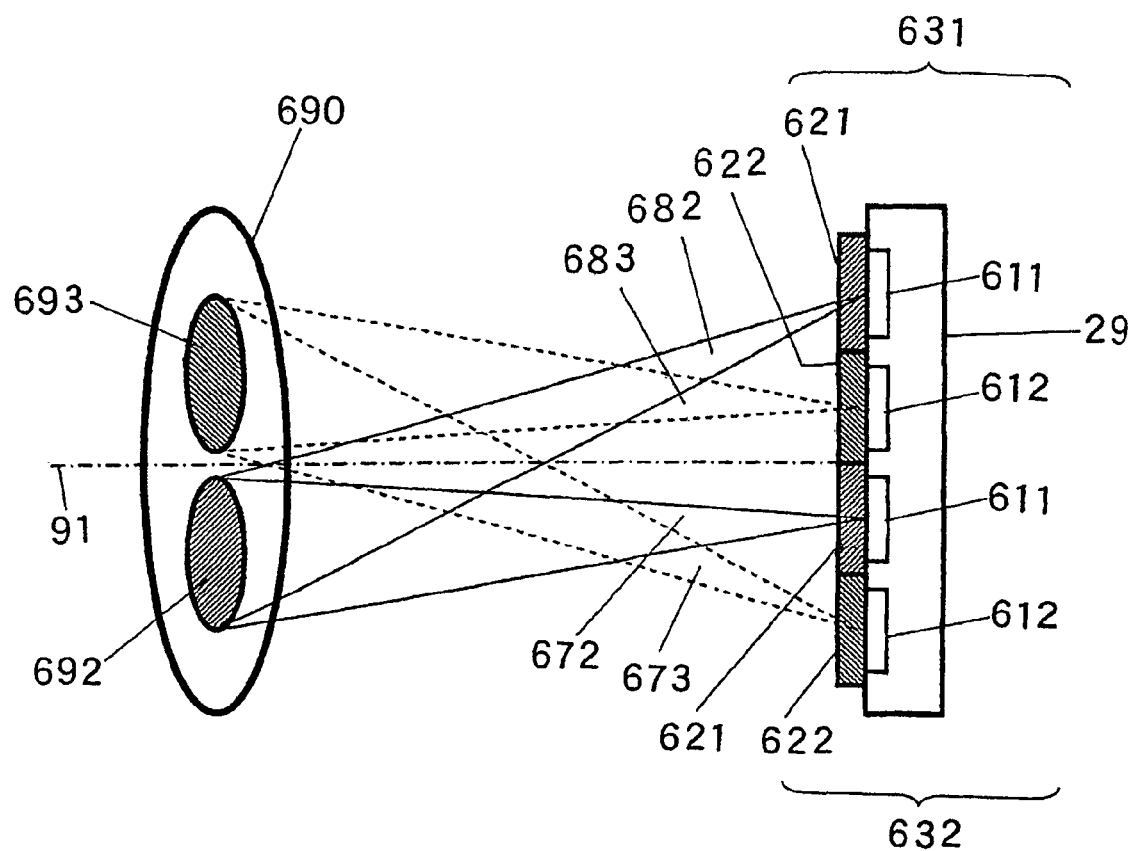
FIG. 32 illustrates a pupil division-type method in conjunction with polarization filters.

FIG. 32 illustrates the concept of a pupil division-type method with polarization filters. FIG. 32 schematically shows four pixels adjacent to one another. Reference numeral 690 in the figure indicates a holding frame for polarization filters, with the area that is not taken up by the polarization filters shielded from light. Reference numeral 692 indicates a polarization filter, which forms a range-finding pupil in correspondence to the position and the shape assumed by the filter. Reference numeral 693 indicates a polarization filter, which forms a range-finding pupil in correspondence to the position and the shape of the filter, and its polarizing direction is perpendicular to that of the polarization filter 692. Reference numeral 91 indicates the optical axis of the exchangeable lens. Reference numeral 621 indicates a polarization filter, the polarizing direction of which matches that of the polarization filter 692. Reference numeral 622 indicates a polarization filter, the polarizing direction of which matches that of the polarization filter 693. Reference numerals 611 and 612 each indicate a photoelectric conversion unit. Reference numeral 631 indicates a type-I pixel, whereas reference numeral 632 indicates a type-II pixel. It is to be noted that reference numerals 672, 673, 682 and 683 each indicate a light flux.

The pixel 631, where the light fluxes having passed through the range-finding pupil formed by the polarization filter 692 are received at the photoelectric conversion unit 611 through the polarization filter 621, outputs a signal indicating the intensity of the image formed with the light flux 672 or 682. The pixel 632, where the light fluxes having passed through the range-finding pupil formed by the polarization filter 693 are received at the photoelectric conversion unit 612 through the polarization filter 622, outputs a signal indicating the intensity of the image formed with the light flux 673 or 683.

By disposing numerous type-I pixels and type-II pixels equipped with polarization filters as described above along a straight line and integrating the outputs from the photoelectric conversion units of the individual pixels into output groups each corresponding to one of the range-finding pupils, information related to the distribution of the intensity of the pair of images formed on the pixel row with focus detection light fluxes passing through the two range-finding pupils can be obtained. By executing image shift detection calculation processing (correlational arithmetic processing and phase-difference detection processing) on this information, the extent of image shift between the pair of images can be detected through the pupil division-type phase-difference detection method.

As described above, the image sensor in the embodiment includes a first focus detection pixel group and a second focus detection pixel group respectively made up with a plurality of first focus detection pixels 311, 313, 314, 317, 318 and a plurality of second focus detection pixels 312, 315, 316, both used to detect the focus adjustment state at the exchangeable lens unit 202 through the pupil division-type method by receiving image light fluxes through the exchangeable lens unit 202, in addition to the imaging pixels 310 each used to convert the image formed through the exchangeable lens unit 202 to an image signal. Since the image detection pitch set for the first focus detection pixel group and the image detection pitch set for the second focus detection pixel group at this image sensor are different from each other, both high-accuracy focus detection and large defocus amount detection can be obtained at the same time while assuring a high image quality for the captured image.

In the embodiment, the pitch with which the first focus detection pixels 311, 313, 314, 317, 318 are set in the first focus detection pixel group and the pitch with which the second focus detection pixels 312, 315, 316 are set in the second focus detection pixel group are different from each other (see FIGS. 7, 24, 28, 29, 30 and 31). Thus, large defocus amount detection is enabled via the pixel row with a large (coarse) pixel pitch and, at the same time, high-accuracy focus detection is enabled via the pixel row with a small (fine) pixel pitch.

In the embodiment, the second focus detection pixel group assumes a greater length than the first focus detection pixel group (see FIGS. 7 and 24). Thus, large defocus amount detection is enabled via the second focus detection pixel group with a greater length and, at the same time, high-accuracy focus detection is enabled via the first focus detection pixel group with a smaller length.

In the embodiment, the pixels in the first focus detection pixel group and the pixels in the second focus detection pixel group are set along matching array directions (see FIGS. 7, 24, 28, 29, 30 and 31). Thus, large defocus amount detection is obtained via one of the pixel rows and at the same time, high-accuracy focus detection is enabled via the other pixel row, along a given direction in which the subject image ranges.

In the embodiment, the first focus detection pixel group and the second focus detection pixel group are disposed in close proximity to each other (see FIGS. 7, 24, 28, 29, 30 and 31). Thus, large defocus amount detection is enabled via one of the pixel groups and at the same time, high-accuracy focus detection is enabled via the other pixel group at a substantially single position within the imaging plane.

In an embodiment, at an end of the first focus detection pixel group, a plurality of first focus detection pixels are disposed with an image detection pitch larger than the image detection pitch set for the first focus detection pixel group and the two different array patterns are set on a single straight line. Thus, large defocus amount detection is enabled via the two pixel groups and at the same time, high-accuracy focus detection is enabled via the first focus detection pixel group present at the center, along a given direction in which the subject image ranges at a substantially single position within the imaging plane.

In the embodiment, pixels with varying levels of color sensitivity are two-dimensionally arrayed by adopting a specific rule and the first focus detection pixel group and the second focus detection pixel group are formed within the two-dimensional pixel array over areas containing pixels with color sensitivity with a low level of the luminosity. By forming the focus detection pixel groups over the areas containing pixels with color sensitivity with a low level of luminosity, to which the human eye does not readily react, any error that may occur when obtaining outputs from the focus detection pixels through interpolation can be made less noticeable to the human eye.

In the embodiment, the image sensor is constituted with a plurality of imaging pixels sensitive to red, green and blue, disposed in a Bayer array, with the first focus detection pixel group and the second focus detection pixel group disposed along horizontal or vertical rows that would otherwise contain imaging pixels sensitive to blue and green within the two-dimensional imaging pixel array. Since the human eye discerns red more easily than blue and the green pixels, disposed with higher density compared to the blue pixels or the red pixels, have a smaller defect contribution factor per pixel, a slight error occurring when generating image signals at positions taken up by the first focus detection pixels and the second focus detection pixels through pixel interpolation can be made less noticeable to the human eye.

The first focus detection pixels and the second focus detection pixels in the embodiment with sensitivity over a wider wavelength range compared to the non-focus detection pixels, i.e., the imaging pixels. Since this assures a sufficient quantity of light even at low brightness levels, the focus detection performance is not affected by the color of the subject image in the focus detection area.

In an embodiment, the first focus detection pixels and the second focus detection pixels each detect a pair of images formed with a pair of light fluxes passing through a pair of areas at the exit pupil of the exchangeable lens unit 202 and thus, accurate focus detection can be executed through the pupil division-type method.

In an embodiment, the pair of images formed with a pair of light fluxes passing through a pair of areas at the exit pupil of the exchangeable lens unit 202 are detected via a plurality of first focus detection pixels 313 and 314 (see FIGS. 25 and 29). In addition, the pair of images formed with a pair of light fluxes passing through a pair of areas at the exit pupil of the exchangeable lens unit 202 are detected via a plurality of second focus detection pixels 315 and 316 (see FIGS. 27, 28 and 29). While at least a pair of photoelectric conversion units need to be installed at each focus detection pixel to allow the pair of images formed with the pair of light fluxes passing through the pair of areas at the exit pupil of the exchangeable lens unit 202 to be received at a single focus detection pixel, each focus detection pixel only needs to be equipped with, at least, a single photoelectric conversion unit if the pair of images are to be received with a plurality of focus detection pixels. Such an image sensor will assume a simpler structure compared to an image sensor having a pair of photoelectric conversion units installed in each pixel, which makes it possible to manufacture the image sensor with more ease at lower cost.

In an embodiment, the photoelectric conversion units are formed so as to partially overlap the pair of areas formed at the exit pupil of the exchangeable lens unit 202 (see FIG. 26). With focus detection pixels allowed to receive a greater quantity of light with the photoelectric conversion units formed as described above, better focus detection performance at low brightness levels is assured.

In an embodiment, the distance between the gravitational centers of the pair of areas at the exit pupil of the exchangeable lens unit 202 formed in correspondence to the first focus detection pixels and the distance between the gravitational centers at the pair of areas at the exit pupil formed in correspondence to the second focus detection pixels do not match. By setting a greater distance between the gravitational centers of the pair of areas defined at the exit pupil of the exchangeable lens unit 202 via focus detection pixels, the focus detection accuracy can be raised, whereas a greater defocus amount detection range can be assured by setting a smaller distance between the gravitational centers. Accordingly, the two types of focus detection pixel groups can be selectively used to better suit specific situations, e.g., focus detection may be first executed to detect a large defocus amount via the focus detection pixel group with the smaller gravitational center interval and then, once the exchangeable lens unit 202 is driven to a point near the focus match position, more precise focus detection may be executed via the focus detection pixel group with the greater gravitational center interval. Through such optimized use of the two types of focus detection pixel groups, high-accuracy focus detection and large defocus amount detection can be realized at the same time while assuring a high image quality for the captured image.

In an embodiment, the distance between the gravitational centers of the pair of areas at the exit pupil of the exchangeable lens unit 202 corresponding to the second focus detection pixels is set shorter than the distance between the gravitational centers at the pair of areas at the exit pupil of the exchangeable lens unit 202 corresponding to the first focus detection pixels and also a larger image detection pitch is set for the second focus detection pixel group than the image detection pitch set for the first focus detection pixel group. In this case, high-accuracy focus detection is enabled via the first focus detection pixel group and focus detection for detecting a large defocus amount is enabled via the second focus detection pixel group. Thus, the focus detection may be first executed to detect a large defocus amount via the second focus detection pixel group and then, once the exchangeable lens unit 202 is driven to a point near the focus match position, more precise focus detection may be executed via the first focus detection pixel group. Through such optimized use of the two types of focus detection pixel groups, high-accuracy focus detection and large defocus amount detection can be realized at the same time while assuring a high image quality for the captured image.

In an embodiment, the width over which the pair of areas at the exit pupil at the exchangeable lens unit 202, corresponding to the second focus detection pixels, range along the direction in which the pupils are set side-by-side, is set smaller than the width over which the pair of areas at the exit pupil of the exchangeable lens unit 202, corresponding to the first focus detection pixels, range along the direction in which the pupils are set next to each other. When the range-finding pupils range over a great width measured along the direction in which they are set side-by-side, fine image structures in the subject image become blurred, resulting in an image containing a low frequency component alone, which makes it difficult to execute accurate image shift detection or may even disable the image shift detection itself. If, on the other hand, the range-finding pupils range over a smaller width measured along the direction in which the pupils are set side-by-side, fine image structures will be retained even in the event of defocusing and thus, accurate image shift detection is enabled (see FIG. 16). As a result, less blurring of the subject image will occur as focus detection is executed to detect a large defocus amount via the second focus detection pixel group, and consequently, a highly accurate image shift detection is enabled by using a high contrast image.

What is claimed is:

1. An image sensor comprising:
    imaging pixels that convert an image formed via an optical system to image signals; and
    a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method, wherein:
    an image detection pitch with which the image is detected via the first focus detection pixel group and an image detection pitch with which the image is detected via the second focus detection pixel group are different from each other.

2. An image sensor according to claim 1, wherein:
    an array pitch at which the first focus detection pixels are disposed in the first focus detection pixel group and an array pitch at which the second focus detection pixels are disposed in the second focus detection pixel group are different from each other.

3. An image sensor according to claim 1, wherein:
    the second focus detection pixel group ranges over a greater length than the first focus detection pixel group.

4. An image sensor according to claim 1, wherein:
    an array direction of the first focus detection pixel group and an array direction of the second focus detection pixel group match each other.

5. An image sensor according to claim 1, wherein:
    the first focus detection pixel group and the second focus detection pixel group are set in close proximity to each other.

6. An image sensor according to claim 1, wherein:
    the first focus detection pixel group and the second focus detection pixel group are set along a single straight line.

7. An image sensor according to claim 6, wherein:
    the second focus detection pixel group is disposed at an end of the first focus detection pixel group.

8. An image sensor according to claim 1, wherein:
    the first focus detection pixels and the second focus detection pixels have sensitivity over a wider wavelength range than pixels other than the first focus detection pixels and the second focus detection pixels.

9. An image sensor according to claim 1, wherein:
    the first focus detection pixels and the second focus detection pixels are each constituted with a micro-lens and a photoelectric conversion unit.

10. An image sensor according to claim 1, wherein:
    the first focus detection pixels and the second focus detection pixels each detect a pair of images formed with light fluxes passing through a pair of areas at an exit pupil of the optical system.

11. An image sensor according to claim 10, wherein:
    the photoelectric conversion unit is formed so as to allow the pair of areas at the exit pupil of the optical system to partially overlap.

12. An image sensor according to claim 10, wherein:
an interval between gravitational centers of the pair of areas at the exit pupil of the optical system, which corresponds to the first focus detection pixels, and an interval between gravitational centers of the pair of areas at the exit pupil of the optical system, which corresponds to the second focus detection pixels, are different from each other.

13. An image sensor comprising:
an imaging pixel group made up with pixels that convert an image formed via an optical system to image signals, formed by arraying a plurality of pixel sets each constituted with a plurality of pixels with sensitivity to different colors; and
a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method, wherein:
an image detection pitch with which the image is detected via the second focus detection pixel group is larger than an image detection pitch with which the image is detected via the first focus detection pixel group; and
the first focus detection pixel group and the second focus detection pixel group are disposed at positions corresponding to pixels sensitive to a color with low luminosity factor in the pixel sets each constituted with a plurality of pixels.

14. An image sensor according to claim 13, wherein:
the pixel sets each include a plurality of pixels sensitive to red, green and blue disposed in a Bayer array, and the first focus detection pixel group and the second focus detection pixel group are disposed at positions corresponding to pixels with sensitivity to blue and green in a two-dimensional array of the imaging pixels.

15. An image sensor comprising:
imaging pixels that convert an image formed via an optical system to image signals; and
a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method, wherein:
an image detection pitch with which the image is detected via the second focus detection pixel group is larger than an image detection pitch with which the image is detected via the first focus detection pixel group; and
the first focus detection pixels and the second focus detection pixels each detect a pair of images formed with light fluxes passing through a pair of areas at an exit pupil of the optical system, and an interval between gravitational centers of the pair of areas at the exit pupil of the optical system, which corresponds to the second focus detection pixels, is shorter than an interval between gravitational centers of the pair of areas at the exit pupil of the optical system, which corresponds to the first focus detection pixels.

16. An image sensor comprising:
imaging pixels that convert an image formed via an optical system to image signals; and
a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method, wherein:
an image detection pitch with which the image is detected via the second focus detection pixel group is larger than an image detection pitch with which the image is detected via the first focus detection pixel group; and
a width over which the pair of areas at the exit pupil of the optical system, which correspond to the second focus detection pixels, range along a direction in which pupils are set side-by-side is smaller than a width over which the pair of areas at the exit pupil of the optical system, which correspond to the first focus detection pixels, range along the direction in which pupils are set side-by-side.

17. An image sensor comprising:
imaging pixels that convert an image formed via an optical system to image signals; and
a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method, wherein:
an image detection pitch with which the image is detected via the second focus detection pixel group is larger than an image detection pitch with which the image is detected via the first focus detection pixel group; and
the first focus detection pixels and the second focus detection pixels each include a photoelectric conversion unit disposed at a position further toward one side relative to a pixel center portion.

18. An imaging device comprising:
an image sensor that includes:
imaging pixels that convert an image formed via an optical system to image signals and a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method; and
a focus detection unit that detects the focus adjustment state at the optical system based upon outputs from the first focus detection pixel group and the second focus detection pixel group, wherein:
an image detection pitch with which the image is detected via the first focus detection pixel group and an image detection pitch with which the image is detected via the second focus detection pixel group are different from each other.

19. An imaging device according to claim 18, wherein:
the focus detection unit selects one of an output from the first focus detection pixel group and an output from the second focus detection pixel group in correspondence to the focus adjustment state.

20. An imaging device according to claim 19, further comprising:

a pixel output generation unit that generates pixel outputs in correspondence to positions of the first focus detection pixels and the second focus detection pixels based upon outputs from pixels surrounding the first focus detection pixels and the second focus detection pixels.

21. An imaging method comprising:

providing an image sensor that includes imaging pixels that convert an image formed via an optical system to image signals;

providing in the image sensor a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method;

detecting the focus adjustment state at the optical system based upon outputs from the first focus detection pixel group and the second focus detection pixel group; and setting an image detection pitch with which the image is detected via the first focus detection pixel group and an image detection pitch with which the image is detected via the second focus detection pixel group differently from each other.

22. An imaging method comprising:

providing an image sensor that includes an imaging pixel group made up with pixels that convert an image formed via an optical system to image signals, which is formed by arraying a plurality of pixel sets each constituted with a plurality of pixels with sensitivity to different colors;

providing in the image sensor a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method;

detecting the focus adjustment state at the optical system based upon outputs from the first focus detection pixel group and the second focus detection pixel group; and disposing the first focus detection pixel group and the second focus detection pixel group at the image sensor so that an image detection pitch at which the image is detected via the second focus detection pixel group is larger than an image detection pitch at which the image is detected via the first focus detection pixel group, at positions corresponding to pixels sensitive to a color with low luminosity factor in the pixel sets, each constituted with a plurality of pixels.

23. An imaging method comprising:

providing an image sensor that includes imaging pixels that convert an image formed via an optical system to image signals;

providing in the image sensor a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method;

detecting the focus adjustment state at the optical system based upon outputs from the first focus detection pixel group and the second focus detection pixel group, generated by detecting via each of the first focus detection pixels and the second focus detection pixels a pair of images formed with light fluxes passing through a pair of areas at an exit pupil of the optical system;

disposing the first focus detection pixel group and the second focus detection pixel group at the image sensor so that an image detection pitch with which the image is detected via the second focus detection pixel group is larger than an image detection pitch with which the image is detected via the first focus detection pixel group; and making an interval between gravitational centers of the pair of areas at the exit pupil of the optical system, which correspond to the second focus detection pixels shorter than an interval between gravitational centers of the pair of areas at the exit pupil of the optical system, which corresponds to the first focus detection pixels.

24. An imaging method comprising:

providing an image sensor that includes imaging pixels that convert an image formed via an optical system to image signals;

providing in the image sensor a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method;

detecting the focus adjustment state at the optical system based upon outputs from the first focus detection pixel group and the second focus detection pixel group;

disposing the first focus detection pixel group and the second focus detection pixel group at the image sensor so that an image detection pitch with which the image is detected via the second focus detection pixel group is larger than an image detection pitch with which the image is detected via the first focus detection pixel group; and making a width over which the pair of areas at the exit pupil of the optical system, which correspond to the second focus detection pixels, range along a direction in which pupils are set side-by-side, smaller than a width over which the pair of areas at the exit pupil of the optical system, which correspond to the first focus detection pixels, range along the direction in which the pupils are set side-by-side.

25. An imaging method comprising:

providing an image sensor that includes imaging pixels that convert an image formed via an optical system to image signals;

providing in the image sensor a first focus detection pixel group and a second focus detection pixel group respectively made up with an array of first focus detection pixels and an array of second focus detection pixels, with the first focus detection pixels and the second focus detection pixels used to receive an image light flux via the optical system to detect a focus adjustment state at the optical system through a pupil division-type method;

detecting a focus adjustment state at the optical system based upon outputs from the first focus detection pixel group and the second focus detection pixel group;

disposing the first focus detection pixel group and the second focus detection pixel group at the image sensor so that an image detection pitch with which the image is detected via the second focus detection pixel group is larger than an image detection pitch with which the image is detected via the first focus detection pixel group; and providing a photoelectric conversion unit disposed at a position further toward one side relative to a pixel center portion in the first focus detection pixels and the second focus detection pixels.

* * * * *